United States Patent
Gauthier et al.

(10) Patent No.: US 12,087,013 B2
(45) Date of Patent: *Sep. 10, 2024

(54) BOUNDARY ESTIMATION SYSTEMS AND METHODS

(71) Applicant: COGNEX CORPORATION, Natick, MA (US)

(72) Inventors: Georges Gauthier, Waltham, MA (US); Anthony Romeo, Auburndale, MA (US); John Jeffrey Link, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,764

(22) Filed: Mar. 6, 2023

(65) Prior Publication Data

US 2023/0401744 A1 Dec. 14, 2023

Related U.S. Application Data

(63) Continuation of application No. 17/079,817, filed on Oct. 26, 2020, now Pat. No. 11,600,018.

(60) Provisional application No. 62/926,227, filed on Oct. 25, 2019.

(51) Int. Cl.
*G06T 7/73* (2017.01)
*B07C 3/14* (2006.01)
*G06K 7/14* (2006.01)
*G06T 7/13* (2017.01)

(52) U.S. Cl.
CPC .............. *G06T 7/75* (2017.01); *G06K 7/1413* (2013.01); *G06K 7/1456* (2013.01); *G06T 7/13* (2017.01); *B07C 3/14* (2013.01)

(58) Field of Classification Search
CPC .......... G06K 7/10; G06K 7/14; G06K 7/1413; G06K 7/1456; G06K 7/1439; G06T 19/00; G06T 7/00; G06T 7/70; G06T 7/11; G06T 7/20; G06T 7/13; G06T 7/62; G06T 7/12; G06T 7/10; G06T 7/215; G06T 7/292; G06T 7/75; B07C 3/14
See application file for complete search history.

(56) References Cited

U.S. PATENT DOCUMENTS

| | | | | |
|---|---|---|---|---|
| 6,554,189 B1 * | 4/2003 | Good | ..................... | G06K 7/109 |
| | | | | 235/462.31 |
| 8,733,656 B2 * | 5/2014 | Wang | .................. | G06K 7/10861 |
| | | | | 235/454 |
| 9,305,231 B2 * | 4/2016 | Marrion | .................. | G06V 10/22 |

(Continued)

FOREIGN PATENT DOCUMENTS

| | | | | | |
|---|---|---|---|---|---|
| CA | 2969622 C | * | 8/2019 | ............ | G01B 11/00 |
| EP | 0926582 A1 | * | 12/1997 | | |
| EP | 0926582 B1 | | 9/2000 | | |

*Primary Examiner* — Nizar N Sivji
(74) *Attorney, Agent, or Firm* — Quarles & Brady LLP

(57) ABSTRACT

A system or method can analyze symbols on a set of objects having different sizes. The system can identify a characteristic object dimension corresponding to the set of objects. An image of a first object can be received, and, a first virtual object boundary feature (e.g., edge) in the image can be identified for the first object based on the characteristic object dimension. A first symbol can be identified in the image, and whether the first symbol is positioned on the first object can be determined, based on the first virtual object boundary feature.

20 Claims, 12 Drawing Sheets

(56) References Cited

U.S. PATENT DOCUMENTS

| | | | | |
|---|---|---|---|---|
| 2011/0254967 | A1* | 10/2011 | Filliettaz, III | H04N 7/181 |
| | | | | 348/E5.042 |
| 2012/0261473 | A1* | 10/2012 | Bombaugh | G06K 7/10831 |
| | | | | 235/462.11 |
| 2015/0122890 | A1* | 5/2015 | Olmstead | G06K 7/10603 |
| | | | | 235/462.14 |
| 2016/0300091 | A1* | 10/2016 | Cumoli | G06K 19/06028 |
| 2018/0157882 | A1* | 6/2018 | Negro | G06K 7/1465 |

\* cited by examiner

BOUNDARY ESTIMATION SYSTEMS AND METHODS

CROSS-REFERENCE TO RELATED APPLICATIONS

This application is a continuation of U.S. patent application Ser. No. 17/079,817, filed Oct. 26, 2020, which claims priority to U.S. Provisional Patent Application No. 62/926,227, titled "Edge Estimation Systems and Methods" and filed Oct. 25, 2019, the entirety of which are incorporated herein by reference.

STATEMENT REGARDING FEDERALLY SPONSORED RESEARCH OR DEVELOPMENT

Not applicable.

FIELD OF THE TECHNOLOGY

The present technology relates to analyzing symbols on a set of objects.

BACKGROUND OF THE TECHNOLOGY

In many contexts, it may be useful to decode a symbol positioned on an object. For example, some symbols can provide identifying data corresponding to the particular object as may assist in appropriate handling of the object during logistical or other processes. For example, to optimize sorting and shipping operations, it may be useful to determine which object (e.g., from a set of objects) corresponds to an identified symbol as well as what information is encoded by the symbol. In some cases, the objects may be moving during an imaging process.

SUMMARY OF THE TECHNOLOGY

Some embodiments of the technology provide a system for analyzing symbols on a set of objects having different sizes. The system can include one or more processor devices configured to identify a characteristic object dimension corresponding to the set of objects. The one or more processor devices can be further configured to receive an image of a first object, and, identify for the first object, based on the characteristic object dimension, a first virtual object boundary feature (e.g., edge) in the image. Additionally, the one or more processor devices can be configured to identify, in the image, a first symbol, and determine, based on the first virtual object boundary feature, whether the first symbol is positioned on the first object.

Some embodiments of the technology provide a system for analyzing symbols on a set of objects having different sizes, including a reference object that exhibits a maximum expected height (or other maximum expected dimension) for the set of objects. The system can include one or more processor devices configured to identify a characteristic object height (or other characteristic object dimension) for the set of objects corresponding to the maximum expected height (or other maximum expected dimension) for the set of objects. An image of a first object can be electronically received, with the first object having an actual height that is different than the maximum expected height (or another actual dimension that spatially corresponds to but is different in size from the maximum object dimension, e.g., an actual width that differs from a maximum expected width). A virtual leading boundary feature (e.g., edge) for the first object can be identified in the image, and a virtual trailing boundary feature (e.g., edge) for the first object can be identified in the image, based on the characteristic object height (or other characteristic object dimension). A first symbol can be identified in the image and whether the first symbol is positioned on the first object can be determined, based on comparing a location of the first symbol in the image with locations of the virtual leading and trailing boundary features.

Some embodiments of the technology provide a system for analyzing symbols on a set of objects having different sizes. The system can include an imaging device configured to acquire a plurality of images at an angle relative to a direction that is normal of the symbols. The system can further include one or more processor devices in communication with the imaging device. The one or more processor devices can be configured to determine a characteristic object height corresponding to the set of objects, and receive, from the imaging device, an image of a first object. Additionally, one or more processor devices can be configured to identify for the first object, based on the characteristic object height, a virtual leading object boundary feature (e.g., edge) in the image and a virtual trailing object boundary feature (e.g., edge) in the image. The one or more processor devices can be further configured to identify, in the image, a first symbol, and determine, based on the virtual leading object boundary feature and the virtual trailing object boundary feature, whether the first symbol is positioned on the first object.

Some embodiments of the technology provide a system for analyzing symbols on a set of objects having different sizes. The system can include one or more processor devices configured to determine a characteristic object height corresponding to the set of objects, the characteristic object height being different from an actual height of a first object of the set. The one or more processor devices can be configured to receive an image of the first object, to identify a virtual trailing boundary feature (e.g., edge) for the first object in the image, based on the characteristic object height, and to identify, in the image, a first symbol. The one or more processor devices can also be configured to determine, based on the virtual trailing boundary feature, whether the first symbol is positioned on the first object.

Some embodiments of the technology provide a method for analyzing symbols on a set of objects having different sizes. The method can include determining setup parameters comprising at least a characteristic object dimension corresponding to the set of objects. The method can further include receiving, from the imaging device, an image of a first object. Additionally, the method can include determining a virtual leading boundary feature (e.g., edge) of the first object in the image, based on the setup parameters, and determining a virtual trailing boundary feature (e.g., edge) of the first object in the image, based on the setup parameters. The method can further include identifying a first symbol in the image, and determining, based on the virtual leading object boundary feature and the trailing object boundary feature, whether the first symbol is positioned on the first object.

Some embodiments of the technology provide a method for analyzing symbols on a set of objects having different sizes. Setup parameters can be determined, including a characteristic object dimension corresponding to the set of objects. An image of a first object, can be received from an imaging device, the first object having at least one actual dimension that is different from the characteristic object dimension. Using one or more processor devices, a virtual leading boundary feature (e.g., edge) of the first object can be identified in the image, based on the setup parameters. Using the one or more processor devices, a virtual trailing boundary feature (e.g., edge) of the first object can be identified in the image, based on the setup parameters. Also using the one or more processor devices, a first symbol in the image can be identified, and whether the first symbol is positioned on the first object can be determined, based on the identified virtual leading and trailing boundary features.

To the accomplishment of the foregoing and related ends, embodiments of the technology can include one or more of the features hereinafter fully described. The foregoing and following description and the annexed drawings set forth in detail certain example aspects of the technology. However, these aspects are indicative of but a few of the various ways in which the principles of the technology can be employed. Other aspects, advantages and novel features of the technology will become apparent from the detailed description herein as considered along with the drawings.

BRIEF DESCRIPTION OF THE DRAWINGS

The features and advantages of the technology are apparent from the following description taken in conjunction with the accompanying drawings in which.

DETAILED DESCRIPTION OF THE TECHNOLOGY

Figure 1A:
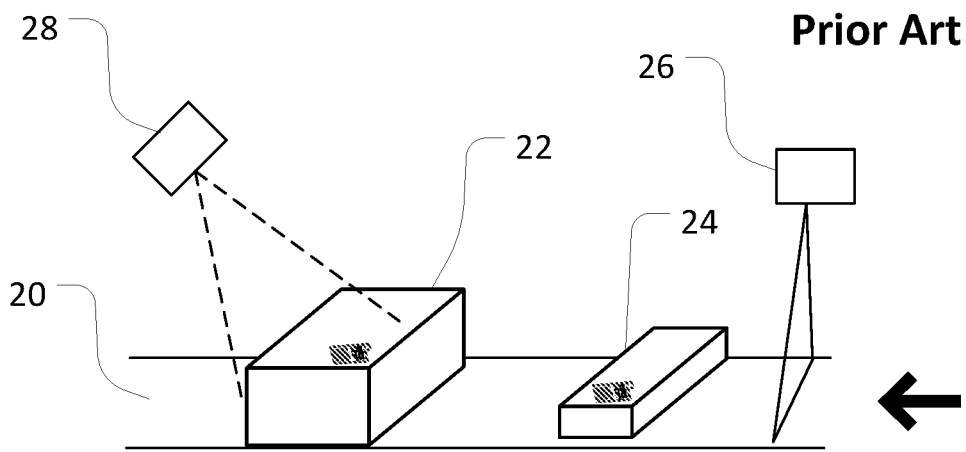
FIGS. 1A and 1B are schematic illustrations of prior art imaging systems.

In the following detailed description, reference is made to the accompanying drawings that form a part hereof. In the drawings, similar symbols typically identify similar components, unless context dictates otherwise. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGS., can be arranged, substituted, combined, separated, and designed in a wide variety of different configurations, all of which are explicitly contemplated herein.

In some implementations, aspects of the technology, including computerized implementations of methods according to the technology, can be implemented as a system, method, apparatus, or article of manufacture using standard programming and/or engineering techniques to produce software, firmware, hardware, or any combination thereof to control a computer or processor based device to implement aspects detailed herein. The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Embodiments of the technology can be implemented as systems or methods, including computer-implemented methods. Some embodiments of the technology can include (or utilize) a device such as an automation device, a special purpose or general purpose computer including various computer hardware (e.g., processor devices), software, firmware, and so on, consistent with the discussion below.

As used herein, unless otherwise specified or limited, the terms "component," "system," "module," and the like are intended to refer to a computer-related system that includes hardware, software, a combination of hardware and software, or software in execution. For example, a component may be, but is not limited to being, a processor, a process running on a processor, an object, an executable, a thread of execution, a program, and/or a computer. By way of illustration, both an application running on a computer and the computer can be a component. One or more components (or system, module, and so on) may reside within a process and/or thread of execution, may be localized on one computer, distributed between two or more computers or processors, or included within another component (or system, module, and so on).

Also as used herein, unless otherwise specified or limited, correspondence between real-world distance and pixels in an image is generally referred to as pixels-per-millimeter ("PPM"). It will be understood, unless otherwise defined or limited, that this correspondence may not necessarily be represented in dimensions of millimeters or as a ratio relative to a single pixel.

Also as used herein, unless otherwise specified or limited, the term "dimensioner" is used to refer generally to a device that is configured to measure one or more actual dimensions or a three-dimensional object. As such, for example, dimensioners can include light curtain measurement systems, ray tracing systems, time-of-flight systems, laser scanning systems, depth-from-scale (e.g., triangulation) systems, or other dimension-measurement systems known in the art.

Certain operations of methods according to the technology, or of systems executing those methods, are represented schematically in the FIGS. Unless otherwise specified or limited, representation in the FIGS. of particular operations in particular spatial order is not intended to require those operations to be executed in a particular order. Certain operations represented in the FIGS., or otherwise disclosed herein, can be executed in different orders, as appropriate for particular embodiments of the technology. Further, in some embodiments, certain operations can be executed in parallel, including by dedicated parallel processors, or separate computing devices configured to interoperate as part of a large system.

As conveyor technology improves and objects are moved by conveyor belts or other conveyor systems with tighter gapping (i.e., spacing between objects), imaging devices may increasingly capture single images that include multiple objects. As an example, a photo eye can control a trigger cycle of an imaging device, so that image acquisition of a particular object begins when a leading edge (or other boundary feature) of the object crosses the photo eye, and ends when a trailing edge (or other boundary feature) of the object crosses the photo eye. When there are relatively small gaps between adjacent objects on a relevant conveyor, the imaging device can inadvertently capture multiple objects during a single trigger cycle. Further, symbols (e.g., barcodes) positioned on the objects may often need to be decoded using the captured images, such as to guide appropriate further actions for the relevant objects. Accordingly, although it can be important to identify which symbols are associated with which objects, it can sometimes be challenging to accurately determine which object corresponds to a particular symbol within a captured image.

Embodiments of the present disclosure can allow imaging systems to distinguish symbols as respectively associated with particular objects out of multiple objects in a device field of view. For example, some embodiments can be configured to accurately determine which symbols in a particular image are or are not associated with any given object in the image. Consequently, embodiments of the present disclosure can allow the use of relatively simple imaging and analysis to maintain relatively high and high-accuracy read rates at reduced gapping (i.e., reduced spacing between successive objects), thus enabling higher throughput for conveyor (or other) systems without requiring particularly expensive or complex imaging systems.

In this regard, some conventional solutions to address tighter conveyor gapping can utilize active object dimensioning and depth-from-scale analysis. Depth-from-scale solutions, for example, can employ imaging systems that are configured to determine actual dimensions (e.g., actual heights) for each object imaged and to assess the location of imaged symbols relative to the objects based on the actual object dimensions. Accordingly, processing and calibrating for depth-from-scale systems can be relatively intensive and time consuming. For example, some depth-from-scale systems may need to be set up (e.g., calibrated) by capturing images of calibration symbols positioned on the top of multiple moving objects of different known heights. The pixel location of the physical object edges and a measurement of PPM at a top surface can then be separately determined and stored for each of the objects. Subsequently, during runtime, the actual heights of imaged objects can then be determined (e.g., using a stand-alone dimensioner), and edges and relevant PPM values then determined based on the determined actual object height and the preceding multi-object setup. Because setup is performed while the conveyor is moving, system commissioning can be time consuming, often requiring a third party to participate during initial setup and troubleshooting. Additionally, because the depth-from-scale method relies on the use of a dimensioner to determine the height of each object, system complexity and cost may be relatively substantial.

An example conventional system with a dimensioner is illustrated in FIG. 1A. In the illustrated example, a conveyor belt 20 is configured to move objects 22, 24 past a dimensioner 26 before the objects 22, 24 are imaged by a camera 28. Based on measurements by the dimensioner 26, an actual height of each of the objects 22, 24 can be determined so that an actual location of the edges of the objects in images acquired by the camera 28 can be determined with relatively high accuracy. Accordingly, whether a symbol in a particular image is disposed on the object 22 or on the object 24 can be determined with relatively high accuracy. However, the use of the dimensioner 26 (e.g., a light curtain device) can add cost and complexity to the overall system, including during installation and setup (e.g., calibration) activities.

Figure 1B:
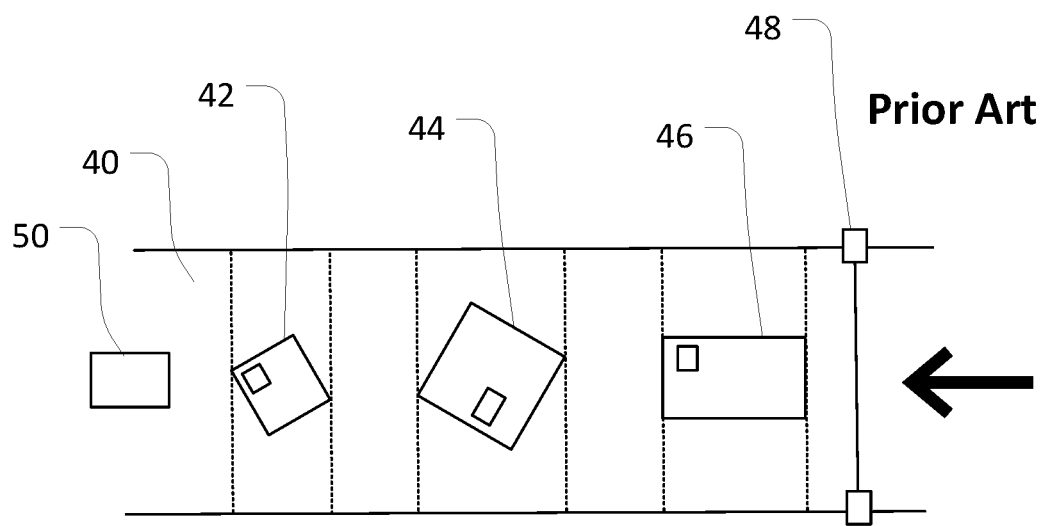

Another example conventional system is illustrated in FIG. 1B. In the illustrated example, a conveyor belt 40 is configured to move objects 42, 44, 46 past a trigger device 48 (e.g., a photo eye), which can be employed to determine the location on the conveyor belt 40 of the leading and trailing edges of each of the object 42, 44, 46 (as indicated by dotted lines in FIG. 1B). A camera 50 with a vertically oriented optical axis can then capture images of the objects 42, 44, 46 and, based on the location of the leading and trailing edges as identified using the trigger device 48, it can be readily determined for a given image whether a particular symbol is a particular one of the objects 42, 44, 46. The system of FIG. 1B can be operated without a dimensioner, but may exhibit limited utility in other regards. For example, to ensure accurate association of particular symbols with particular objects, it may be necessary to install the camera 50 only in a vertical (i.e., straight downward-looking) orientation. Accordingly, the system of FIG. 1B may exhibit reduced accuracy due to reduction of image quality from reflections off of the objects 42, 44, 46. Further, it may not be possible to capture useful images of symbols that are not on the top surfaces of relevant objects.

Embodiments of the disclosed technology can provide improved systems and methods for imaging and evaluating moving objects, including as compared to conventional depth-from-scale systems or other conventional imaging and evaluation systems, such as those illustrated in FIGS. 1A and 1B. For example, some embodiments of the present technology can eliminate the need for a dimensioner, by eliminating the need to determine the exact dimensions (e.g., height) of every object to be imaged as a precursor to identifying whether a symbol is on or off of a particular object. The elimination of a dimensioner can allow for a simplified overall system design and simplified computational operations, as well as a general reduction in system cost.

Further, some embodiments of the present disclosure provide a setup method that can be performed while objects are stationary (e.g., such that a conveyor is not required to run during setup). And many embodiments can be adjusted to accommodate a wide variety of angled image-capture arrangements (e.g., for imaging devices that are not oriented straight-down or straight-sideways relative to objects), which can reduce interference from reflections, improve system accuracy, and allow for reliable capture and analysis of symbols on side surfaces of objects. Other advantages for some embodiments will also be made apparent through the description herein.

To provide improvements over conventional approaches, some embodiments of the technology can be configured to operate relative to a set of objects to be imaged, each of which objects may exhibit any variety of dimensions (e.g., within specified maximum bounds) and may be expected to be separated from successive objects along a conveyor by at least a minimum gap. In particular, for example, systems and methods according to some embodiments can be configured to determine a characteristic object dimension for the set of objects. In some cases, only a single characteristic dimension may need to be determined for an entire set of objects. For example, in some cases, a single characteristic dimension (e.g., a characteristic height) may be generally determined for and applied to a plurality of boxes, each of which may have different actual dimensions (e.g., actual heights). In this regard, for example, the characteristic dimension may not necessarily correspond to actual physical dimensions for a particular subset of objects to be analyzed, but may instead correspond to a maximum (or other) expected dimension, such as a maximum object height or width for a given system.

After relatively simple calibration of the relevant system (as also discussed below), and with an appropriately configured imaging device, a predetermined characteristic dimension (e.g., as discussed above) can then be used to identify a virtual boundary feature (e.g., a virtual leading or trailing edge) of a particular one of the multiple objects, within an image of the particular object. A symbol can also be identified within the image, and a location of the symbol can then be compared with the virtual boundary feature in order to determine whether the symbol is positioned on the object.

Generally, a virtual boundary feature can represent an edge of a two-dimensional (2D) or three-dimensional (3D) virtual model of a particular object, such as may facilitate assignment of symbols in the image to (or not to) the object. In some cases, the location of a virtual boundary feature in an image can correspond to the location of a corresponding actual (physical) edge or other feature in the image, such as a top or other leading or trailing edge of a rectangular box. In some cases, however, an identified virtual boundary feature in an image may not necessarily match an image location of the corresponding actual (physical) edge or other feature of the relevant object, but may, for example, instead provide an approximation of an edge of a virtual spatial envelope for the object. For example, if a characteristic dimension is determined as a maximum expected object height for a set of objects, and a particular object within the set has a height that is smaller than the maximum height, the identified location of a virtual trailing edge of the particular object in an image may be determined to be rearward of (or otherwise different from) the actual trailing edge of the object within the image, relative to a direction of travel. However, with appropriate calibration, including relative to the size of the minimum gap between objects, it may be usefully assumed that no actual boundaries of an adjacent (e.g., subsequently passing) object is likely to intrude in the image past the virtual trailing (or other) edge of the particular object being analyzed. In other words, for example, a virtual top (or other) trailing edge can be treated as a worst-case location of a top (or other) trailing edge of a particular object in an image, for use in assessing whether a symbol in the image is located on the particular object or not.

Thus, for example, symbols in an image can be reliably and efficiently identified as being on (or off) an object based on comparing a location of the symbols to the pixel location of a virtual boundary feature of the object (e.g., virtual edge), rather than to the pixel location of the actual object boundary feature (e.g., actual edge). Notably, in this approach, it may not be possible to exactly identify a location of a corresponding actual edge or other feature of the object, such as may require specialized and expensive equipment or relatively intensive computational processes. In this regard, relying on identified virtual features for a full set of objects, rather than determining the location of an actual corresponding feature for each of the objects individually, may allow for the use of relatively low cost and lower complexity systems than in conventional arrangements. Accordingly, it may be substantially useful to use a virtual object boundary feature to evaluate the location of an imaged symbol relative to an imaged object, without determining the exact actual location of a relevant object boundary feature in an image, such as by using depth-from-scale analysis or otherwise.

As used herein, a virtual object "edge" may not necessarily correspond to an extended linear (or other) edge of a geometric shape. For example, where a box is oriented on a conveyor such that a corner of the box is forward- or rearward-most on the conveyor, virtual leading and trailing edges identified according to embodiments of the technology may correspond to a virtual location of the leading and trailing top corners of the box (e.g., rather than of a linear edge of a top surface of the box). Despite the inherent virtual enlargement of such a box via the extrapolation of a corner of the box to a virtual "edge" in a virtual model of the box, this approach may still provide a useful approximation of a profile of the box, particularly where successive boxes (or other objects) are separated by appropriate spacing, as can be expected in many industrial applications. Further, in some cases, other geometric approaches to virtual boundary features can be used.

In some examples below, embodiments of the disclosed technology are applied relative to rectangular objects with edges that are aligned squarely relative to each other and relative to a direction of motion (e.g., of a conveyor). In other implementations, embodiments of the technology can be readily applied relative to objects exhibiting other orientations.

Figure 2:
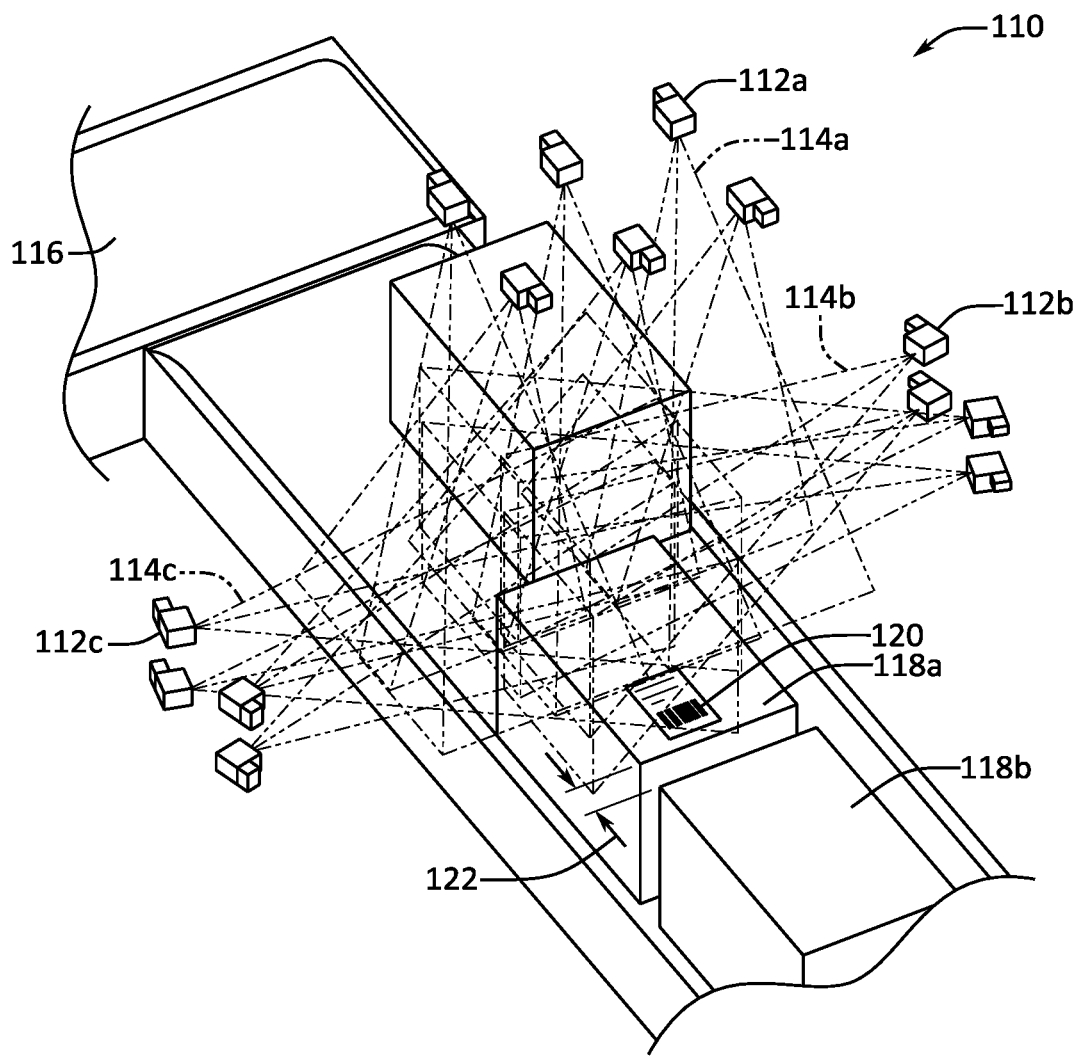
FIG. 2 is an illustration of a tunnel imaging system, according to embodiments of the technology.
Figure 3:
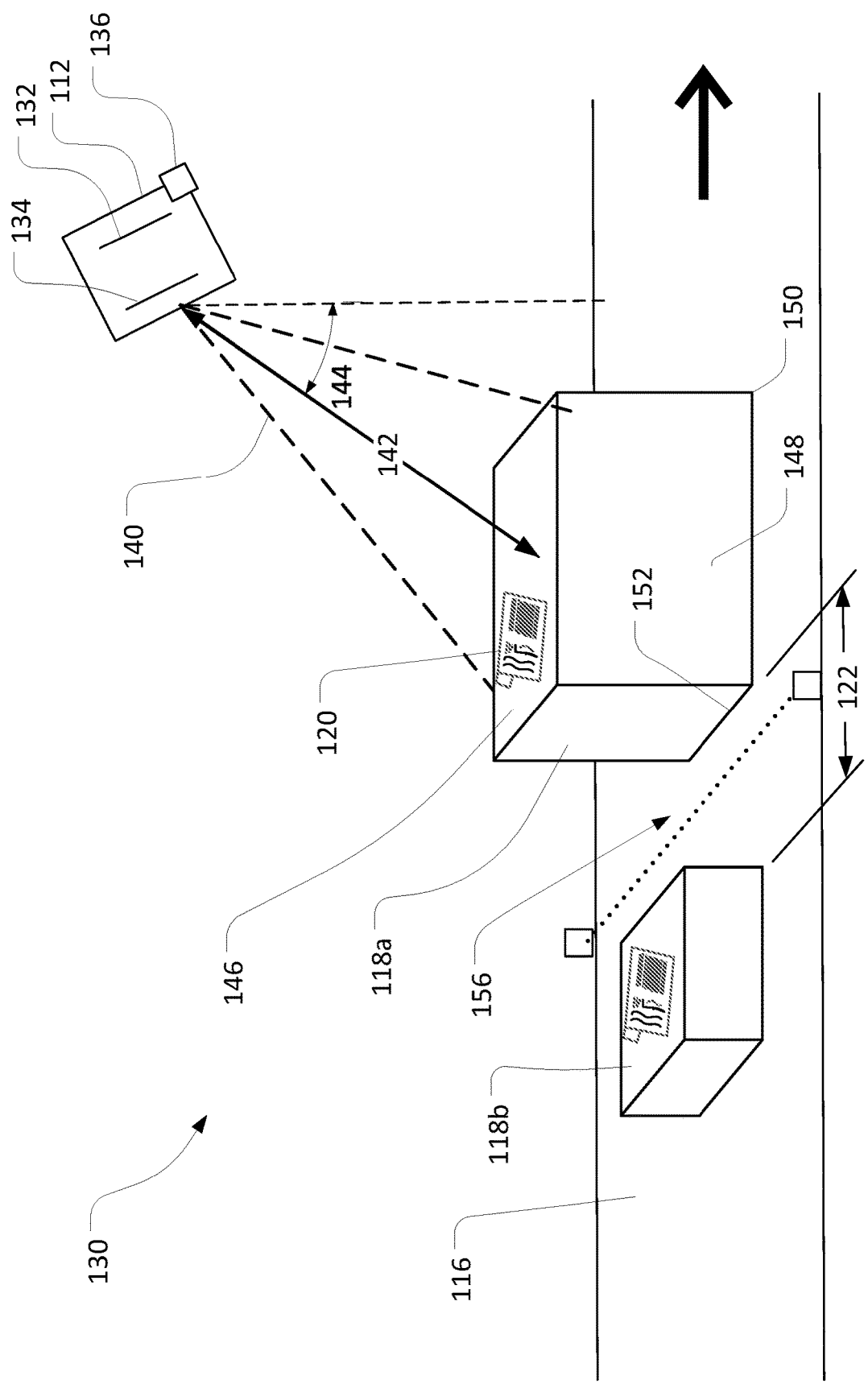
FIG. 3 is a schematic view of an imaging system, according to embodiments of the technology.

Referring to FIGS. 2 and 3, example machine vision systems 110, 130 are illustrated for evaluating symbols on objects (e.g., objects 118*a*, 118*b*), including a symbol 120 on an object 118*a*, according to embodiments of the technology. In the illustrated embodiments, the symbol 120 is a flat 2D barcode on a top surface of the object 118*a*, and the objects 118*a*, 118*b* are rectangular boxes. In other embodiments, however, other configurations are possible. For example, any variety of geometries are possible for an object to be imaged, and any variety of symbols and symbol locations can be imaged and evaluated, including non-DPM symbols and DPM symbols located on a top or any other side of an object.

In the illustrated context of FIG. 2, the objects 118*a*, 118*b* are disposed on a conveyor 116 that is configured to move the objects 118*a*, 118*b* in a horizontal direction past (or through) the system 110 at a predictable and continuous rate. In other embodiments, objects may be moved into or past a system according to embodiments of the technology in a variety of ways (e.g., with non-linear movement). In some embodiments, objects may be stationary relative an imaging system. In some embodiments, imaging systems may be configured to be moved relative to the objects, and the symbols, that are to be evaluated.

Generally, systems according to the technology can include an imaging device and a processor device (see, e.g., imaging device 112 and processor device 136 in FIG. 3). In the embodiment illustrated in FIG. 2, the system 110 includes a plurality of imaging devices in a tunnel arrangement, representatively shown via imaging devices 112a, 112b, 112c, each with a field-of-view ("FOV"), representatively shown via FOV 114a, 114b, 114c, that includes part of the conveyor 116. In the illustrated embodiments, each of the imaging devices 112 is positioned at an angle relative to the conveyor top or side (e.g., at an angle relative to a normal direction of symbols on the sides of the objects 118a, 118b or relative to the direction of travel), resulting in an angled FOV. Likewise, some of the FOVs overlap with other FOVs (see, e.g., FOV 114a and FOV 114b). Accordingly, the system 110 can be configured to capture one or more images of multiple sides of the objects 118a, 118b as the objects 118a, 118b are moved by the conveyor 116. The captured images can then be used to identify symbols (e.g., a symbol 120), which can be subsequently decoded (as appropriate).

Generally, a variety of known types of imaging devices can be used. For example, in some embodiments, it may be particularly useful and efficient to use 2-D imaging devices (e.g., 2-D cameras) of various configurations, such as area scan cameras or line scan cameras. In some embodiments, an imaging device can be an integrated system that includes a lens assembly and an imager, such as a CCD or CMOS sensor. In some embodiments, in view of the approaches detailed herein, it may be possible to execute useful functionality according to this disclosure without requiring a 3-D imaging device or a 2-D imaging device in combination with a separate dimensioner (e.g., a laser range finder, a depth-from-scale device, etc.). In some embodiments, as also discussed below, a different number or other arrangement of imaging devices than is shown in FIG. 2 can be used.

Also in the embodiment illustrated, a gap 122 is provided between objects 118a, 118b. In different implementations, gaps between objects can range in size. In some implementations, gaps between objects can be substantially the same between all sets of objects in a system, or can exhibit a fixed minimum size for all sets of objects in a system. In some implementations, a minimum or target size for the gap 122 can be specified as a predetermined system parameter. Generally, operators may prefer to specify as small a size for the gap 122 as possible, to maximize system throughput. As another advantage of embodiments of the disclosed technology, as also discussed below, relatively small gap sizes may be used in some implementations, as calibrated to particular imaging angles, without sacrificing accuracy with regard to determining whether a symbol in an image is disposed on one or another objects in the image.

The multi-device arrangement of the system 110 can be useful in some contexts, as it can help to ensure that appropriate images are captured of each relevant object and symbol that travels along the conveyor 116, such as by ensuring that all visible sides of an object are imaged. In other embodiments, however, other configurations are possible, including configurations with different numbers or arrangements of imaging devices. Similarly, some imaging devices can be aligned with (e.g., rather than angled relative to) a direction of travel of relevant objects or a direction that is normal to relevant symbols.

Referring particularly to FIG. 3, the imaging device 112 and the processor device 136 can be configured in a variety of ways, including, respectively, as an arrangement of one or more electronic imaging sensors (e.g., an imaging sensor 132) and one or more lens assemblies (e.g., a lens assembly 134), and as a programmable general purpose computer device or dedicated (special-purpose) machine-vision computer. In some embodiments, an imaging device and a processor device can be part of physically separated systems. For example, an imaging device can be configured to communicate with a remotely disposed processor device (e.g., part of a cloud-based computing system) in order to execute certain operations in some implementations of the technology. In some embodiments, an imaging device can be configured as a follower device, which may be generally controlled by a primary device and may, as appropriate, provide image data or other information to the primary device for processing.

As shown by FIG. 3, the system 130 includes a single imaging device 112, although multiple imaging devices can be positioned within the system 130 in some embodiments (see also FIG. 2). In particular, the imaging device 112 is positioned with an optical axis thereof at an imaging angle 144 that is angled obliquely relative to a surface of the conveyor 116. Accordingly, the imaging device 112 has a corresponding angled FOV 140, which can be configured to allow appropriate imaging of a variety of objects (e.g., the objects 118a, 118b) that can have different sizes or shapes. For example, the object 118a is shown to include several surfaces, including a first side 148, and a top surface 146, and to be substantially taller than an object 118b. This height aspect can result in the symbol 120 being relatively close (as indicated by a distance 142) to the imaging device 112 as the conveyor 116 moves.

In some embodiments, the oblique aspect of the imaging angle 144 can help to reduce (e.g., prevent) glare from various surfaces (e.g., the symbol 120, the conveyor 116, etc.), which can occur when an imaging device is positioned to image a surface straight-on (i.e., from a direct top view, a direct side view, etc.). Additionally, the imaging angle 144 can enable image capture of multiple sides of an object. As shown by FIG. 3, for example, the imaging device 112 is positioned to image the front side and the top surface 146 of the object 118a. Other arrangements, however, can be configured to image other sets of sides of particular objects (e.g., top and rear surfaces, lateral side and front or rear surfaces, and so on)

As noted above, different embodiments of the technology can include a variety of numbers and configurations of imaging device. In this regard, for example, the system 130 can sometimes serve as a sub-system of a larger machine vision system (e.g., the system 110 of FIG. 2). Likewise, some embodiments of the technology can include systems similar to the system 130, as stand-alone systems or as parts of larger machine vision systems that differ from the system 110. Further, although the system 130 is illustrated with the imaging device 112 above the objects to be imaged, some embodiments can include imaging devices that are similarly configured but disposed to image objects from a different perspective (e.g., from the side, with an oblique imaging angle relative to a direction of travel of the relevant objects).

Still referring to FIG. 3, a trigger device configured as a photo eye 156 is configured to transmit a beam across the conveyor 116. The photo eye 156 can generally include a transmitter and a receiver, mounted opposite one another. The photo eye 156 can communicate with the imaging device 112, such that beam interruptions, as may indicate passage of an object, can trigger image capture by the imaging device 112. Notably, the photo eye beam can extend fully across the conveyor 116 (e.g., through gaps between objects, such as the gap 122), so that the photo eye 156 can be used to identify actual leading and trailing features (e.g., edges or corners) of relevant objects (e.g., the objects 118a, 118b). In some embodiments, the photo eye beam can provide an indication to the system 130 that a first object (e.g., object 118a) has moved fully past the photo eye 156, prior to a second object (e.g., object 118b) interrupting the photo eye beam and triggering a subsequent image capture. In this way, for example, the photo eye 156 can identify an actual leading edge 150 of the object 118a, and an actual trailing edge 152 of the object 118b, during real-time movement of the conveyor 116. (Generally, designations of "leading" or "trailing" for particular edges or other features can be assigned based on the direction of travel, as indicated by an arrow (see, e.g., FIG. 3), although other approaches are possible.)

In different embodiments, different trigger mechanisms can be used. For example, in some embodiments, the photo eye 156 can be configured as an optical device that uses laser light to identify the passage of objects along the conveyor 116. In other embodiments, however, other configurations are possible.

Generally, embodiments of the technology can include devices to track physical movement of objects. For example, some embodiments can include encoders that are linked to relevant conveyor and imaging systems, to provide electronic signals to the imaging systems that indicate the amount of travel of the conveyor—and objects supported thereon—over a known amount of time. This may be useful, for example, in order to coordinate capture of images of particular objects, based on calculated locations of the objects relative to a field of view of a relevant imaging device.

Figure 4:
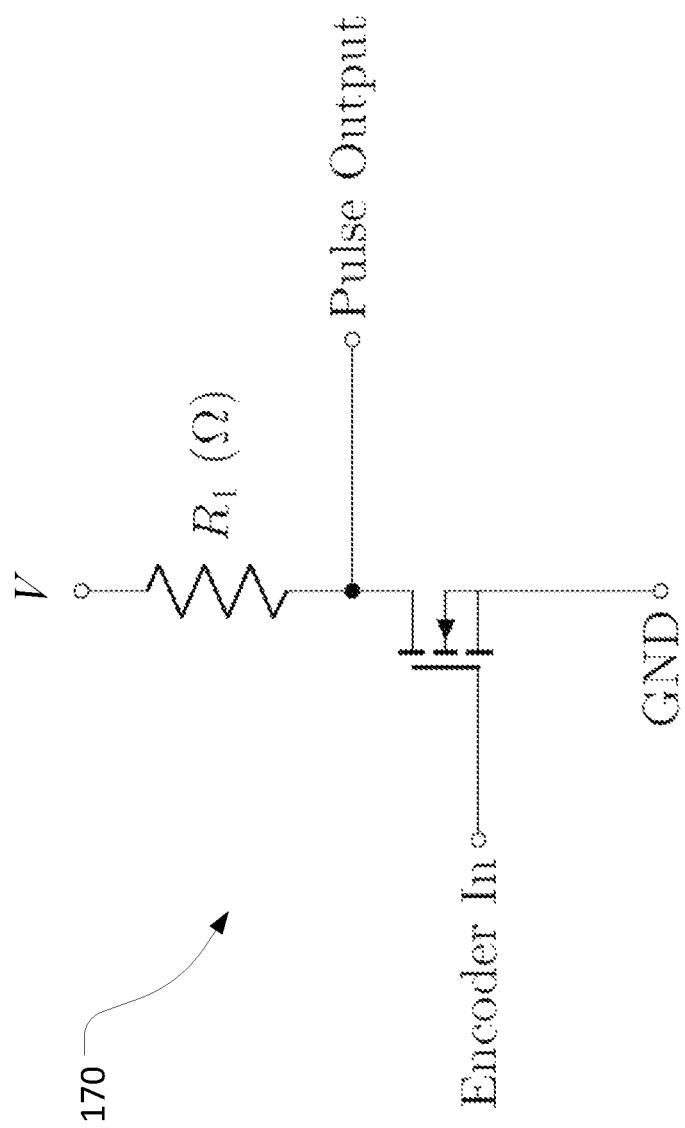
FIG. 4 is a schematic view of an encoder circuit, according to embodiments of the technology.

Referring to FIG. 4, for example, an example encoder circuit 170 is shown, according to some embodiments of the technology, which can be shared among one or more imaging devices of a system (e.g., imaging device 112a, 112b, 112c of FIG. 2), such as by providing a pulse output from the encoder circuit 70 as an input to each relevant imaging device. According to some embodiments, $R_1=V/I$(# imaging devices), where V is the input voltage. In some embodiments, V can be provided as 24V. Additionally, in some embodiments, I can be provided as 5 mA. In some embodiments, including as shown, the encoder circuit 170 can include an n-channel power MOSFET. In particular, for example, the encoder circuit 170 can include an IRF840 MOSFET. In some embodiments, the encoder circuit 170 can provide shared encoder input ticks to multiple imaging devices, which can be used to calculate encoder ticks per trigger cycle, as well as distance traveled by an object (e.g., between particular images).

As also discussed above, a device such as the encoder circuit 170 can be used to trigger image capture for particular objects. For example, the encoder circuit 170 can be used to calculate a location of a particular object after the object passes a trigger device (e.g., the photo eye 156) and to thereby determine when the object may be passing into (or out of) an FOV of a relevant imaging device or when the object may be otherwise appropriately placed for imaging.

Generally, embodiments of the present invention may require relevant images to show at least part of a gap between two successive objects, in order to be used for reliable evaluation of symbol location. In this regard, for example, the size of a gap (see, e.g., the gap 122 of FIG. 3), and the dimensions of sets of adjacent objects (e.g., the objects 118a, 118b) can affect the utility of resulting images, including for analysis of symbols on particular objects. For some configurations, an imaging device (e.g., the imaging device 112) may capture images in which a first symbol positioned on a first object appears in the same image with a second symbol positioned on a second object. Further, for smaller sizes of a gap, a first object may sometimes overlap with a second object in an image. This can occur, for example, when the size of a gap is relatively small, and a first object (e.g., the object 118a) is relatively tall. When such overlap occurs, it can accordingly sometimes be very difficult to determine if a detected symbol corresponds to a specific object (i.e., if a symbol should be considered "on" or "off" of the object). As alluded to above, although depth-from-scale or other dimensioning systems can help to address this difficulty, some embodiments of the disclosed technology can provide beneficial alternatives.

Figure 5:
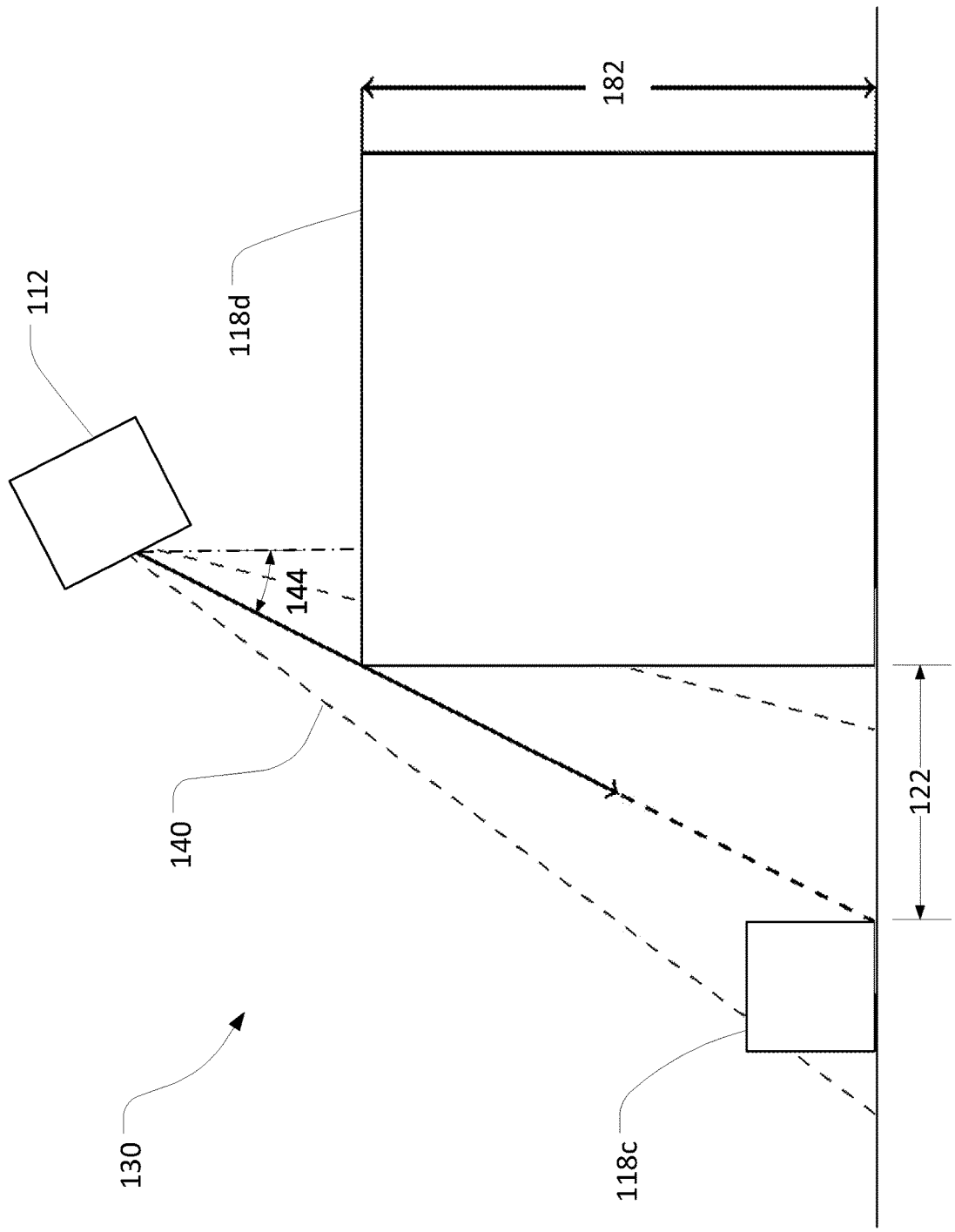
FIG. 5 is a schematic view of geometric aspects of an imaging system and associated objects, according to embodiments of the technology.

In this regard, it may be useful to subject some embodiments of the technology to certain geometric constraints, including with regard to an angle of an FOV for a particular imaging device and with regard to a particular expected gap size between successive objects. Referring now to FIG. 5, for example, certain geometric relationships are illustrated for the system 130, according to embodiments of the present disclosure. As shown, an object 118d with a height 182 corresponds to a "tallest expected object" for the system 130, indicating that no objects that exceed a maximum expected height equal to the height 182 (herein, also "h") are intended to be analyzed by the system 130. For a rearward angled imaging device, such as the imaging device 112 as illustrated, a tallest relevant object can be expected to "protrude" into the gap between objects, in a captured image, by a maximum expected amount as compared to less tall objects. Accordingly, in order to ensure that at least a small part of the gap 122 remains visible in images that might capture the object 118d and a successive object 118c (i.e., so that the imaged objects do not overlap), it may be appropriate to utilize Equation 1 (below) to set a size of the gap 122, based on the maximum box height 182 (h) and an FOV angle 144 of the imaging device 112 (herein, also "θ"), or to set the angle 144, based on a known size of the gap 122 and the maximum expected box height 182:

$$\text{gap}=h\cdot\tan(\theta). \quad (1)$$

Advantageously, use of Equation 1 can provide flexibility for system configurations (e.g., for the system 130), such that users can selectively configure the inter-object gap (e.g., the gap 122) or the imaging angle (e.g., the angle 144) to provide appropriate alignment of the relevant imaging device. Further, with appropriate configuration of the imaging device 112 and the gap 122 (or other devices or gaps), use of Equation 1 can help to reliably ensure that the gap 122 is always visible between the objects 118d, 118c—and other sets of objects), in images acquired by the imaging device 112.

Although some discussion of FIG. 5, above, relates specifically to rearward facing cameras, similar considerations can also apply to side mounted and forward facing cameras. It will be understood, for example, that Equation (1) can be employed in a similar manner as discussed above in order to appropriately arrange such systems.

Figure 6:
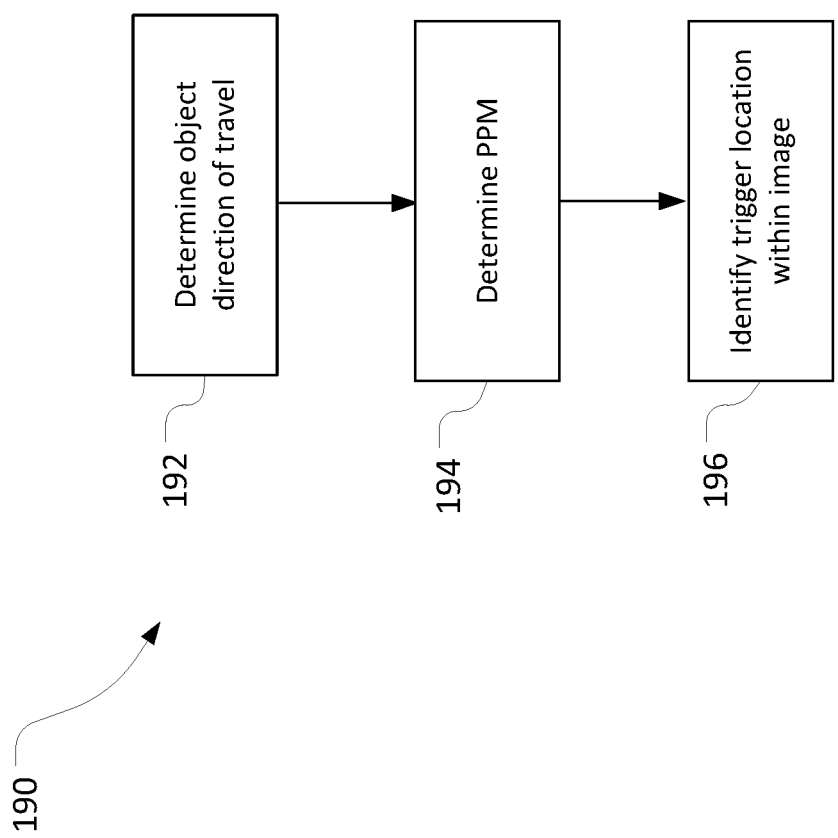
FIG. 6 is a diagrammatic view of a setup method, according to an embodiment of the technology.

Referring now to FIG. 6, in some embodiments, a system (e.g., the systems 110, 130) can be set up using an example setup method 190 prior to normal operation. In some embodiments, each imaging device (e.g., imaging device 112a, 112b, 112c) can be set up (e.g., calibrated) while the relevant conveyor is stationary, or while the conveyor is running (e.g., with image buffering), as appropriate for a given system. In some embodiments, the ability to set up (e.g., calibrate) a system without a conveyor running can provide significant advantages, including with regard to reduced complexity, as compared to depth-from-scale-based (or other) systems, that may require a conveyor to be running during setup.

In some embodiments, in order to estimate the locations of leading and trailing edges of an object in a FOV (e.g., to identify virtual leading or trailing edges), the direction of travel within the FOV can be determined 192, such as top-to-bottom or bottom-to-top, for example. This can be useful, for example, in order to establish the direction of travel of an object through successive images, including for correlation to tracking signals (e.g., encoder ticks), as also discussed below. In some cases, direction of travel can be determined 192 based upon user input or otherwise retrieved from pre-established system parameters.

The setup method 190 can also include determining 194 a PPM for the relevant arrangement. For example, in some embodiments, a single symbol of known size can be imaged at a specific location, and a pixel size of the symbol measured (e.g., automatically or manually). A PPM can then be determined 194 based upon the known symbol size and the measured pixel size to convert real-world distance (e.g., in millimeters) to pixels as captured by an imaging device. In other embodiments, a variety of other approaches can be used to determine 194 a relevant PPM.

In some embodiments, PPM can be determined 194 as a characteristic PPM, rather than as an exact PPM for any given analysis (e.g., of a particular barcode on a particular box). For example, a characteristic PPM value can be determined 194 based on a characteristic (e.g., worst-case) location of a symbol or other relevant feature and the characteristic PPM value then used as an approximate indicator of correspondence between real-world and image distances, even for features at other real-world distances from the relevant imaging device. In some embodiments, for example, if an imaging device is configured to acquire images from a lateral side of the relevant objects, PPM can be determined 194 based upon images of a feature (e.g., symbol) on a closest possible object surface (i.e., the closest possible surface relative to the imaging device). For example, on a right-justified conveyor, a right side imaging device can be used to determine 194 a characteristic PPM by imaging a symbol on the closest (justified) edge of the object. In contrast, for example, for an unjustified conveyor, a side imaging device can be used to determine 194 a characteristic PPM by imaging a symbol on the closest possible object (i.e., the closest possible surface for the set of objects within the system), such as may correspond to the widest object that may be expected for the system.

In some embodiments, if the imaging device is configured to imaging the top of the relevant objects, a system can be configured to determine 194 a characteristic PPM by imaging a symbol located at the surface of the conveyor. This may be useful as a "worst-case" measurement, for example, because the farthest away an object edge will ever appear in an image from an overhead imaging device is at the conveyor surface. However, in some embodiments, PPM can be determined 194 based on measurements at any variety of other locations, including for actual PPM measurements and for characteristic PPM measurements.

In the illustrated example, the setup method 190 also includes identifying 196 a trigger location in an image, for the relevant imaging device, so that an expected location of virtual object edges can be accurately identified within subsequent images. In some embodiments, identifying 196 a trigger location can include aligning an object with a "trigger on" location for the imaging device (e.g., at a beam of a photo eye) and then acquiring an image of the object. In some embodiments, identifying 196 a trigger location can include manually aligning an object edge to a trigger device (e.g. the photo eye 156), as may be relatively easy to accomplish if the trigger location of the trigger device is visible within the imaging device FOV.

In some embodiments, a trigger location can be identified 196 by aligning an object edge to a "trigger start" location, such as for systems that use a "trigger on" delay. This can be achieved, for example, by measuring the "trigger on" delay distance from the relevant photo eye, and aligning an object edge with the corresponding location. Alternatively, for example, this can be achieved by enabling "buffering and transfer," and storing the first image from an acquisition sequence (while an object travels by the photo eye). Regardless, once an appropriate image has been acquired, the appropriate pixel location (e.g., along a y-axis) of the physical trigger location (e.g., along a conveyor) can then be identified 196.

In some embodiments, a trigger location can be identified 196 using one or more images of an object that exhibits a characteristic dimension, such as an object with a characteristic height. For example, a leading side of an object with a maximum expected height for a particular system can be aligned with a photo eye or other relevant location, and an image of the object can be acquired. A pixel location of the top leading edge of the object can then be identified 196 as the relevant trigger location for subsequent operations, including by using user-guided electronic analysis (e.g., using a setup or drawing tool) or otherwise. As also discussed below, the identified 196 trigger location, as corresponds to the pixel location of an edge of an object of characteristic dimension (e.g., a top edge of an object of maximum expected height) can then be used during run-time to approximate a location of an edge of a different object, including objects of different actual dimensions, as may be useful to conduct further analysis of relevant symbols.

Figure 7:
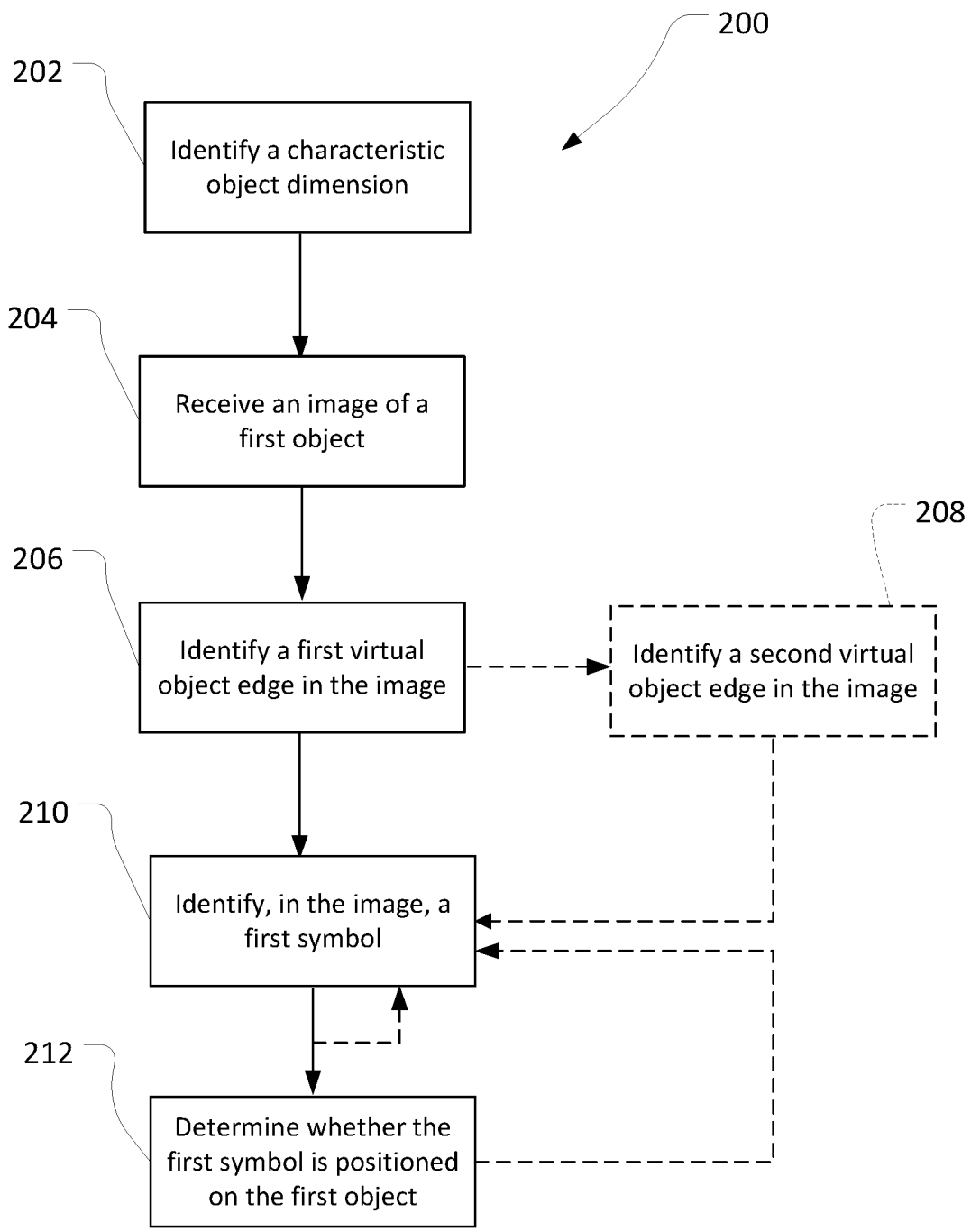
FIG. 7 is a diagrammatic view of a run-time method, according to an embodiment of the technology.

Referring now to FIG. 7, an example method 200 for analyzing symbols is shown, according to some embodiments of the technology. The method 200 can be implemented via the imaging device 112 (see FIG. 3), in some embodiments, or by a variety of other machine vision systems or processing devices.

In the illustrated embodiment, the method 200 includes identifying 202 a characteristic object dimension. As described above, a characteristic object dimension can sometimes correspond to a characteristic object height for a set of objects that may be imaged by a system (e.g., one of the systems 110, 130). In some embodiments, including for some top-mounted imaging devices, the identified 202 characteristic object height can correspond to a height of a tallest object (or expected object) within the object set (i.e., a maximum expected object height). In some embodiments, including for some side imaging devices, a characteristic object width can be identified 102 as a characteristic object dimension. For example, the characteristic object width can correspond to a width of the widest object (or expected object) within the object set (i.e., a maximum expected object width), in some embodiments. In some embodiments, a characteristic object dimension can be determined based on a stored 3D representation of a reference object, such as a largest expected object in a set of objects to be processed.

As also noted above, for some run-time operations, an identified 202 characteristic object dimension may be different in size than a spatially corresponding actual dimension of a particular object that is to be imaged. (As used in this context, "spatially corresponding" indicates a dimension of a same type, for example respective heights of multiple different objects are spatially corresponding dimension.) In this regard, for example, a characteristic object dimension may sometimes be identified 202 as a maximum expected height (or width) of all objects that are to be processed by the relevant system. However, some objects to be processed by the system may have actual heights (or widths) that are smaller than the identified 202 maximum expected height (or width). Accordingly, execution of the method 200 may sometimes include associating a characteristic height (or other dimension) with one or more objects that exhibit a different actual height (or other spatially corresponding dimension).

As discussed herein, a characteristic object dimension (e.g., characteristic object height or characteristic object width) can be considered more generally as an example of a setup parameter. According to some embodiments, setup parameters of various types (e.g., calibration parameters) can be stored in or loaded to an imaging device that has acquired a relevant image of a symbol, or to a variety of other computing systems. Further, in some embodiments, identifying 202 a characteristic object dimension can be included in a setup process, such as the method 190 of FIG. 6. For example, as part of a setup process, a user may specify or measure a characteristic object dimension (e.g., maximum object height), to be saved as one of several setup parameters for the relevant system. In this regard, in some embodiments, an object with an actual dimension substantially the same as the characteristic object dimension (e.g., a height equal to a maximum expected height) can be used to identify 196 a characteristic trigger location of an edge of an object in a relevant image (see FIG. 6).

In some implementations, setup parameters can be adjusted over time, including through runtime updates. For example, a dimensioner can be configured to sample dimensions of objects being processed by a system during runtime, and to update characteristic object dimensions (e.g., characteristic height or width) or other setup parameters, as appropriate, based on that sampling. In some implementations, such a dimensioner can be included within an imaging device, although the dimensioner may not necessarily be configured to measure the actual dimensions of every object to be imaged. Further, in such an arrangement, an associated processor device may not necessarily use the actual dimensions of any given object to analyze symbol locations, as may be enabled, for example, by the use of characteristic and virtual object dimensions as discussed herein.

A characteristic object dimension can be identified 202 in a variety of ways. In some embodiments, a user of a relevant system may manually input a maximum dimension (or dimensions) that are expected for objects to be processed by the system. For example, based on predetermined system parameters, a user may enter, via a setup interface of a dedicated computing system, the maximum expected height, width, or depth of boxes or other objects to be processed. In some embodiments, a maximum dimension can be identified 202 in other ways, such as via electronic communications from a dimensioner of a separate system, analysis of images of characteristic objects, or otherwise.

Still referring to FIG. 7, the illustrated method 200 also includes receiving 204 an image of a first object. In some embodiments, the received 204 image can be an image that includes a decodable symbol. Generally, the received 204 image can be captured by an imaging device (e.g., the imaging device 112 of FIG. 3). In some embodiments, such an image can be electronically received 204 at a processor device of the acquiring imaging device for further processing. In some embodiments, such an image can be received 204 at a remote processor device (e.g., at a primary camera or cloud-based system) for further processing. As noted above, the object for which an image is received 204 may not necessarily exhibit a relevant actual dimension that spatially corresponds to the identified 202 characteristic dimension. For example, the relevant object may exhibit an actual height that is smaller than an identified 202 characteristic (e.g. maximum) height.

Continuing, the method 200 also includes identifying 206 a first virtual object edge for a relevant object in the received 204 image. In particular, in some embodiments, a virtual object edge can be identified 206 based upon the identified 202 characteristic object dimension. For example, based on a trigger signal and on calibrated parameters of the relevant imaging device and associated systems, an expected location of the object on a conveyor in an image can be determined. A corresponding location of a virtual edge of that object can then be relatively simply geometrically determined based on an assumption that the object extends by the identified 202 characteristic object dimension above (or otherwise away from) that expected location. In some embodiments, as also noted above, an identified 196 trigger location can correspond to an expected location of a particular edge of an object of a relevant characteristic dimension. Accordingly, in some embodiments, a relevant virtual object edge can be identified 206 directly based upon a previously identified 196 trigger location.

In some implementations, consistent with the discussion above, the identified 206 virtual object edge may not necessarily match the actual pixel location of the actual edge of the relevant object. For example, as also discussed above, actual relevant dimensions of some objects (e.g., actual object heights) may not always match the identified 202 characteristic dimension (e.g., maximum object heights). Where, for example, an actual object height is smaller than an identified 202 characteristic object height, the identified 206 virtual object edge for that object may be somewhat forward (or rearward) in the relevant image as compared to the actual edge of the object. However, as also discussed below, where an appropriate characteristic object dimension has been identified 202 and appropriate object spacing has been employed, this discrepancy may not necessarily impede useful analysis of images.

In order to identify 206 the pixel location of the first virtual object edge, a pixel offset for a relevant image, as measured from the triggered start of image acquisition, can sometimes be calculated. For example, a number of encoder ticks that has elapsed after image acquisition was triggered for an object can be determined. Then, based on known characteristics of the encoder (e.g., actual distance per tick) and of the imaging device (e.g., PPM), this number of ticks can then be readily converted to a distance, in pixels, that the object has traveled from the start of the trigger to the time of the current image. Further, as appropriate, this distance can then be added to the identified 196 trigger location (see FIG. 6) in order to determine the pixel location of the virtual object edge in a given image. In this regard, for example, the identified 206 pixel location of the first virtual object edge can be equivalent to the pixel distance traveled by the first object edge after image acquisition was triggered, added to any offset from the trigger location in the image, and adjusted to account for the use of the identified 202 characteristic object dimension (e.g., rather than the actual object dimension) to identify 206 the virtual object edge.

In some embodiments, the identified 206 first characteristic object edge can correspond to a characteristic trailing edge of an object (e.g., corresponding to the leading edge 152 in FIG. 3). This may be useful, for example, to ensure that the identified 206 virtual trailing edge can provide a characteristic (e.g., worst-case) "rear" boundary to the relevant object in images of the object, to help guide analysis of whether a symbol is located on the object without necessarily finding the exact pixel location of the actual leading edge of the object. In some embodiments, however, other approaches are possible, including approaches that identify 206 virtual features other than actual edges.

In some embodiments, the method 200 can further include identifying 208 a second virtual object edge in the image. In some embodiments, the second virtual object edge can correspond to a virtual leading edge of an object (e.g., the leading edge 150 in FIG. 3), although other approaches are possible. Generally, the second virtual object edge can be identified 208 in a similar manner to identification 106 of the first virtual object edge, with the exception that identifying 108 the second virtual object edge may rely on a "trigger start" as a reference point, instead of "trigger end," according to some embodiments.

With at least one virtual object edge having been identified 206, 208, a virtual boundary of the associated object can be determined (e.g., a virtual edge, vertex, or other boundary feature, or a geometric aspect, such as a line, coinciding with a particular boundary feature). In some embodiments, a virtual boundary may include part or all of a virtual 2D or 3D shape corresponding to one or more worst-case (e.g., maximum possible) dimensions of objects of a set to be analyzed by a relevant system. For example, with a virtual leading edge and a virtual trailing edge having been identified 206, 208, for an object by a top (or side) mounted imaging device, a virtual top (or side) surface of the object can be identified for a given image of the object. As alluded to above, this virtual top (or side) surface may not necessarily exactly match the actual top (or side) surface of the object, as represented in the relevant image. Rather, for some objects, the virtual top (or side) surface can be considered as a useful approximation of where within a given image the actual top (or side) surface of the relevant object may be, regardless of the actual size of the object. Similarly, with appropriate calibration, such a virtual boundary can also serve as a useful approximation of where within a given image other objects (e.g., preceding or subsequent objects on a conveyor) may not be.

In this regard, for example, after an appropriate characteristic dimension (e.g., a maximum expected height or width) has been identified 202, the corresponding virtual top (or side) surface for any given object that a system is designed to analyze may represent a worst-case (e.g., largest) expected size of the actual top (or side) surface of the object. Further, with appropriate arrangement of an imaging system (e.g., as discussed with regard to FIG. 5 and Equation (1)), the noted virtual surface can be identified (e.g., using the identified 206, 208 virtual edges) to approximate the location of relevant actual object surfaces while also avoiding inclusion of surfaces of other successive (or preceding) objects.

Still referring to FIG. 7, the method 200 also includes identifying 210, in the received 204 image, a first symbol. In some embodiments, the first symbol can be decoded upon being identified 210, although decoding or other analysis may be delayed in some embodiments. In some embodiments, the method 200 can include identifying 210 multiple symbols in a given image, including symbols that may be disposed on different objects.

As described above, tight gapping between objects can sometimes cause other symbols to appear in an image with the identified 210 first symbol, such as when a given image includes multiple objects. Accordingly, determining if the first symbol is "on" or "off" a relevant object can help to ensure that each particular symbol is associated with the correct object.

In this regard, for example, once a symbol has been identified 210, the method 200 also includes determining 212 whether the identified 210 symbol is positioned on a relevant object. According to some embodiments, the identifying 206, 208 locations of the first and second virtual edges of an object in pixel space can be compared to characteristic (e.g., standardized, identifying) features of an identified 210 symbol, such as one or more corners of the symbol, a timing pattern, or other known patterns. Based on the comparison, the symbol can be determined 212 as being either "on" the object, or "off" the object. For example, if relevant features of the identified 210 symbol are substantially between the identified 206, 208 virtual edges or otherwise within an identified virtual boundary for an object, the symbol may be determined 212 as being located on the object. In contrast, if relevant features of the identified 210 symbol are substantially outside of a virtual surface bounded by the identified 206, 208 virtual edges, the symbol may be determined 212 as being located off the relevant object. In some embodiments, users may be able to customize parameters for evaluating whether a particular symbol is on-object or off-object, such as the percentage or fraction of area, features, or other characteristics of a symbol that should be within identified 206, 208 virtual edges to be considered on-object.

As also alluded to above, in some embodiments, the method 200 (and other methods disclosed herein) can be implemented individually, by each of multiple imaging devices in a system. For example, aspects of the method 200 can be separately implemented by any number of the imaging devices 112a, 112b, 112c illustrated in FIG. 2, including with (or without) a shared encoder circuit. In some embodiments, the method 200 (and other methods disclosed herein) can be implemented on a separate device (e.g., a separate primary imaging device), with the images being acquired and provided to the separate device by acquiring imaging devices (e.g., the imaging device 112a, 112b, 112c).

Figure 8:
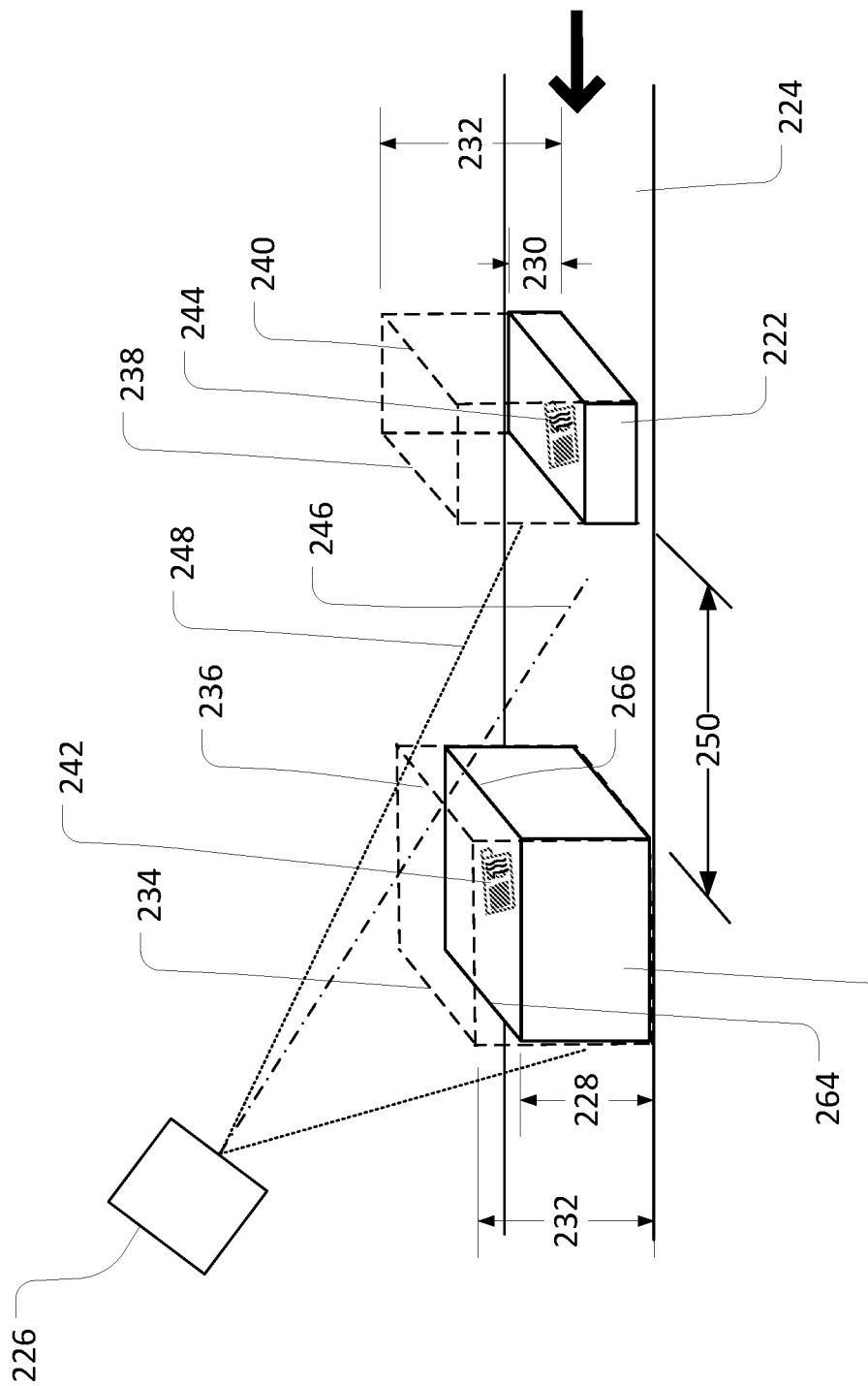
FIG. 8 is a schematic view of aspects of an imaging system and method, according to embodiments of the technology.
Figure 9:
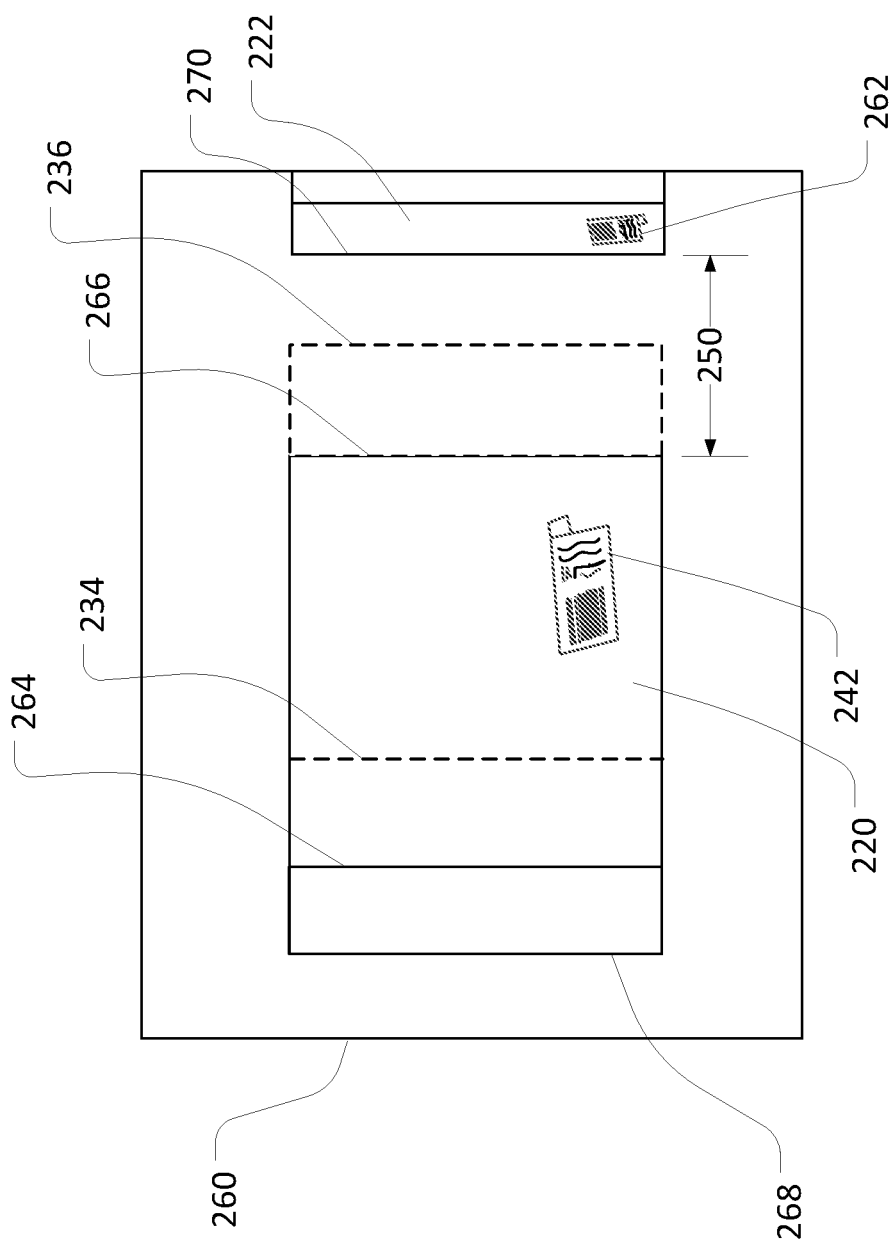
FIG. 9 is a representation of an image captured using the system and method illustrated in FIG. 8.

FIGS. 8 and 9 illustrate aspects of operations consistent with the method 200 or other methods according to the disclosed technology. In the illustrated example, objects 220, 222 within a larger set of objects are being moved along a conveyor system 224 and a 2D area-scan imaging device 226 is disposed obliquely relative to the conveyor system 224 to capture images of the objects 220, 222. In the illustrated embodiment, the objects 220, 222 exhibit actual heights 228, 230 that are smaller than a maximum height 232 that has been identified as a characteristic height for the larger set of objects that are to be handled by the conveyor system 224.

In the illustrated system, a trigger device (not shown) has been installed to track passage of the objects 220, 222 toward the imaging device 2226, and the imaging device 226 has been set up (e.g., as discussed above) both to capture appropriate images of the objects 220, 222 during runtime and to implement an appropriate PPM value for those images. Thus, the imaging device 226 is generally enabled to capture images of the objects 220, 222 and to identify, in the images, the virtual leading and trailing edges 234, 236, 238, 240 of the objects 220, 222, respectively. The imaging device 226 is also configured, using known approaches, to identify and decode (as appropriate) the barcode symbols 242, 244 on the objects 220, 222.

Further, to ensure appropriate imaging of the objects 220, 222, a gap distance 250 between the objects 220, 222 and an imaging angle of the imaging device 226 have been collectively selected using equation (1) (see above). Accordingly, during imaging of the object 220, a reference line 246 through a FOV 248 of the imaging device 226 that intersects a projection of the object 220 to a virtual 3D profile with the maximum height 232 intersects the conveyor system 224 ahead of the object 222.

As illustrated in FIG. 9, an example image 260 acquired by the imaging device 226 includes the object 220 in its entirety and a leading portion of the object 222. Further, due to the imaging angle of the imaging device 226, front and top faces of both of the objects 220, 222 are visible, including an additional barcode symbol 262 on the front face of the object 222.

In order to analyze the image to determine whether a particular barcode or other symbol is on or off of each of the objects 220, 222, the imaging device 226 can identify, based on the previously identified characteristic maximum height 232, a location in the image 260 of the virtual edges 234, 236 of the object 220. As shown in FIG. 9, because the object 220 is shorter than the characteristic height 232, the virtual edges 234, 236 are rearward (i.e., to the right) in the image 260 from actual top leading and trailing edges 264, 266.

In some cases, the imaging device 226 can also be configured to identify other features. For example, based on signals from the trigger device (not shown) and an encoder (not shown), the imaging device 226 may be configured to automatically identify a pixel location of the actual lower leading edges 268, 270 of the objects 220, 222.

Based on an appropriate combination of one or more of the identified virtual and actual edges, the imaging device 226 can accordingly identify, efficiently and without the need for dimensioners or other similarly complex equipment, whether the symbols 242, 262 are on or off of the object 220. For example, based on a virtual model of the object 220 that is bounded by the actual lower leading edge 268 and the virtual top trailing edge 236, the imaging device 226 can distinguish the object 220 from the object 222 in the image and, accordingly, can determine that the symbol 242 is located on the object 220, whereas the symbol 262 is not. In this regard, for example, the imaging device 226 can sometimes operate by defining a reading range for the object 220 that generally includes the visible surfaces of the virtual model of the object 220 and can identify particular symbols as being on or off of the object 220 based on whether the symbols do or do not fall within the reading range in the image 260. In this regard, for example, as illustrated with regard to the use of the actual leading edge 268, a reading range for an object can sometimes extend beyond one or more virtual edges that have been identified for the object.

As an additional benefit, based on a (partial) virtual model of the object 222 that is based on the actual lower leading edge 270, the imaging device 226 may also determine that the symbol 262 is (or is likely to be) located on the object 222. Accordingly, in some implementations, the imaging device 226 can store or buffer an image of the symbol 262 for treatment during analysis of the object 222 (e.g., based on later-acquired images).

Figure 10:
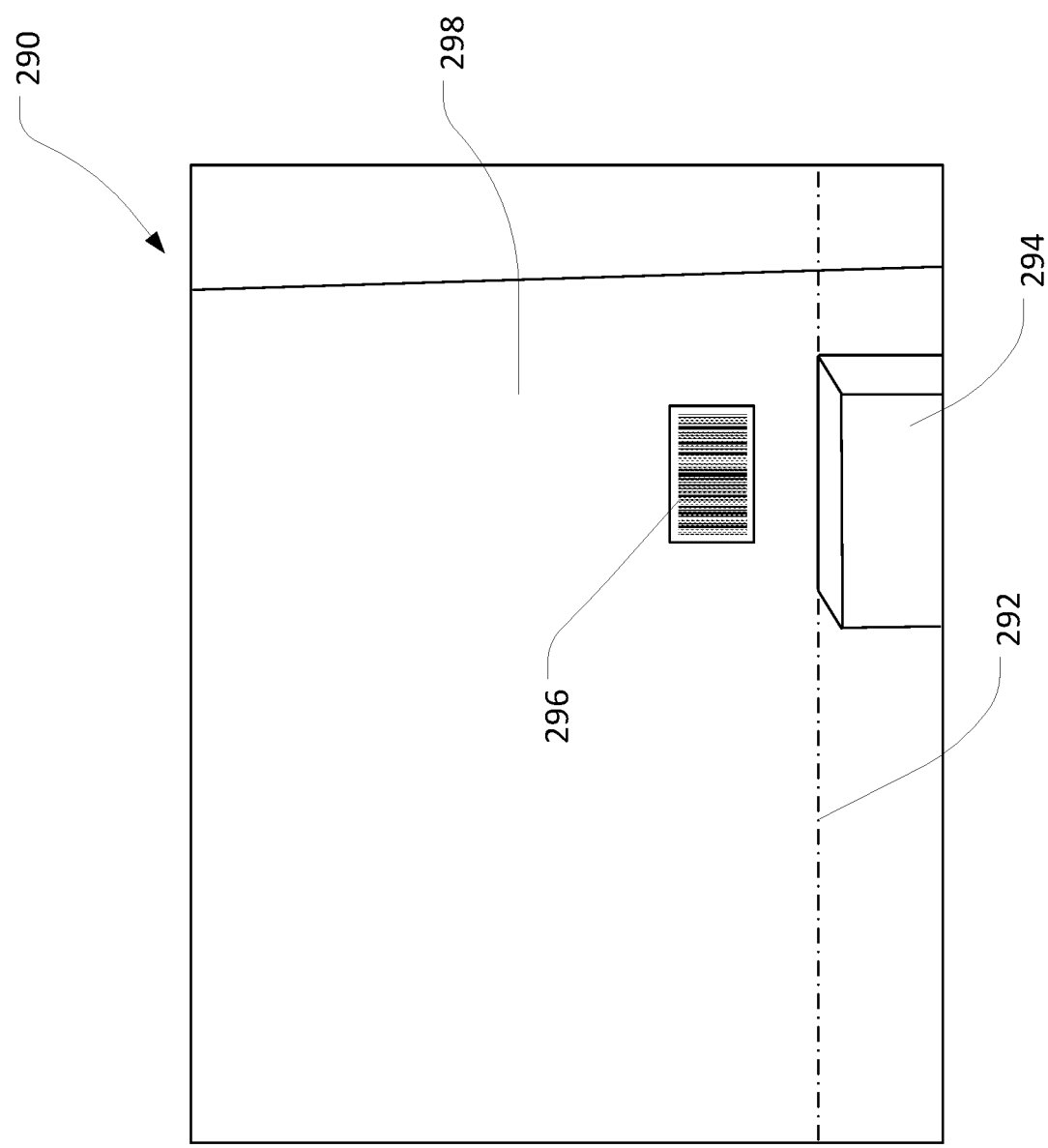
FIGS. 10 and 11 are views of a user interface for setup and run-time analysis of symbols, according to an embodiment of the technology.
Figure 11:
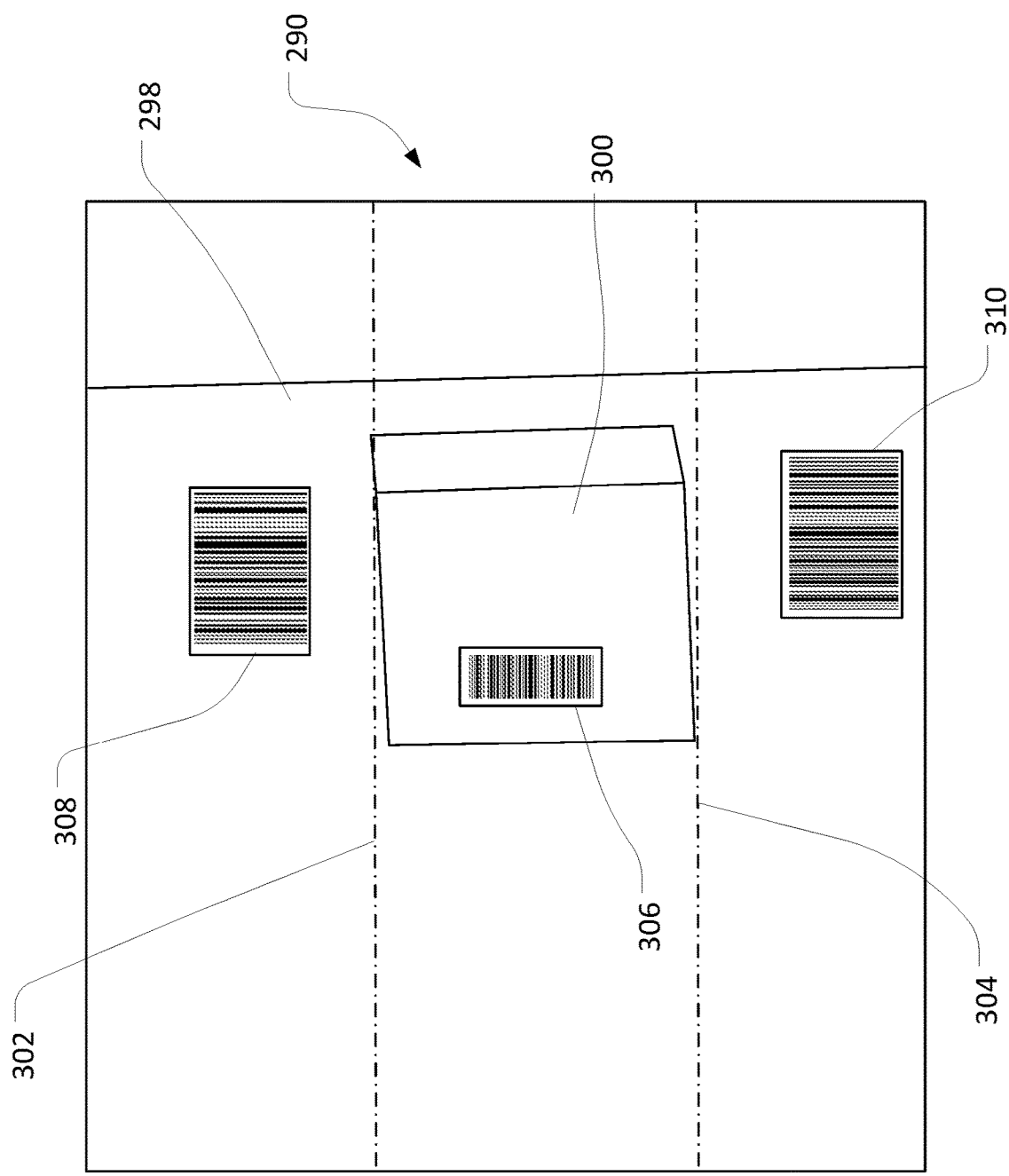

As further examples, FIGS. 10 and 11 illustrate example views in an example graphical user interface (GUI) 290 during example setup and runtime operations, consistent with some of the examples discussed above (e.g., during implementation of the methods 190 and 200 as shown in FIGS. 7 and 8). FIG. 10 in particular illustrates a line 292 that corresponds the identified 196 trigger location (see FIG. 7) for an example system and implementation. In the illustrated example, the line 292 corresponds to a pixel location of a leading edge of a maximum-height box 294 when the box 294 first triggers image acquisition (e.g., crosses a beam of a photo eye). As also discussed above, however, other approaches are possible. Based on the illustrated image, the pixel location of the line 292—and the corresponding characteristic or virtual edge—can be determined using known machine vision approaches (e.g., automatically), via computer-assisted manual interrogation of the image on the GUI 290 (e.g., user-guided pixel counting), or otherwise. In some embodiments, only a single measurement may need to be taken, with a single characteristic object, to identify a pixel location of the trigger that can be used for subsequent calculations regarding multiple different objects (e.g., as described above). In some cases, however, additional measurements can be made.

FIG. 10 also illustrates a calibration feature, configured as a conventional barcode symbol 296 having known dimensions. In the illustrated example, the symbol 296 is not on the box 294 but instead is disposed at a level of a conveyor belt 298 of the system. Accordingly, in some embodiments, the pixel size of the symbol 296 can be analyzed in order to determine 194 a characteristic PPM for the system (as measured at the height of the conveyor 298), consistent with the discussion above. As similarly discussed above, in some embodiments, only a single measurement may need to be taken, with a single characteristic calibration feature at a single characteristic location, to determine a characteristic PPM that can be used for subsequent calculations regarding multiple different objects (e.g., as described above). In some cases, however, additional measurements can be made.

FIG. 11 illustrates an example view of the GUI 290 during run-time operations, such as may be implemented after setup activities as represented in FIG. 10. In particular, FIG. 11 shows an image of a box 300, along with virtual leading and trailing edges 302, 304 as may have been identified 206, 208 in accordance with the method 200 (as discussed above). FIG. 11 also shows an image of barcodes 306, 308, 310 such as may have been previously identified 210 also in accordance with the method 200. Based on a comparison between the locations of the virtual edges 302, 304 and the locations of the barcodes 306, 308, it can be readily determined that the barcode 306 is on the box 300 but the barcodes 308, 310 are not.

In the example of FIG. 11, the virtual edges 302, 304 are substantially aligned with the actual edges of the box 300 and the relevant FOV is oriented substantially normal to the conveyor 298. However, a similar and similarly reliable process can be completed, in accordance with the disclosure herein, to identify on-object and off-object symbols for any variety of object sizes and FOV angles, based on appropriately calibrated system parameters. In this regard, for example, as also discussed above, identified virtual edges of some objects in some implementations may not exactly align with the pixel location of the actual edges of those objects. Indeed, in some embodiments, as discussed above, analysis of symbol location can proceed without necessarily requiring exact identification of the actual location of leading and trailing edges (or other features) of a particular object in a particular image.

In some embodiments of the technology, the method 200 (or others) can also include storing (e.g., buffering) certain symbols that have been identified as off-object, for use in the following trigger cycle. For example, in the example illustrated in FIG. 11, the barcode 310 can be determined to be off of the box 300 and therefore not relevant to the box 300. However, because the barcode 310 is behind the virtual trailing edge 304 of the box 300, it may be likely that the barcode 310 is on-object for a successive box. Accordingly, the barcode 310 can be stored (e.g., in a relevant imaging device) until a triggered acquisition cycle begins for the object that follows the box 300, then retrieved for analysis relative to that object. In some cases, accordingly, storage of off-object symbols can effectively provide extra images for symbol analysis for the following trigger cycle and corresponding object.

In some embodiments, it may be possible to determine (e.g., determine 212) whether a symbol is positioned on an object based on factors other than the locations of the symbol and the associated one or more virtual object edges (at least as initially defined). This may be useful, for example, for imaging devices that are installed at an angle that enables images to be captured of multiple faces of an object (e.g., front, back, or side faces of a box, for a top mounted imaging devices). In this regard, for example, it may be possible in some embodiments to specify a pixel (or other) distance beyond the initially-defined virtual object edges (or other image features), such that symbols within this extended distance may also be considered on-object.

Figure 12:
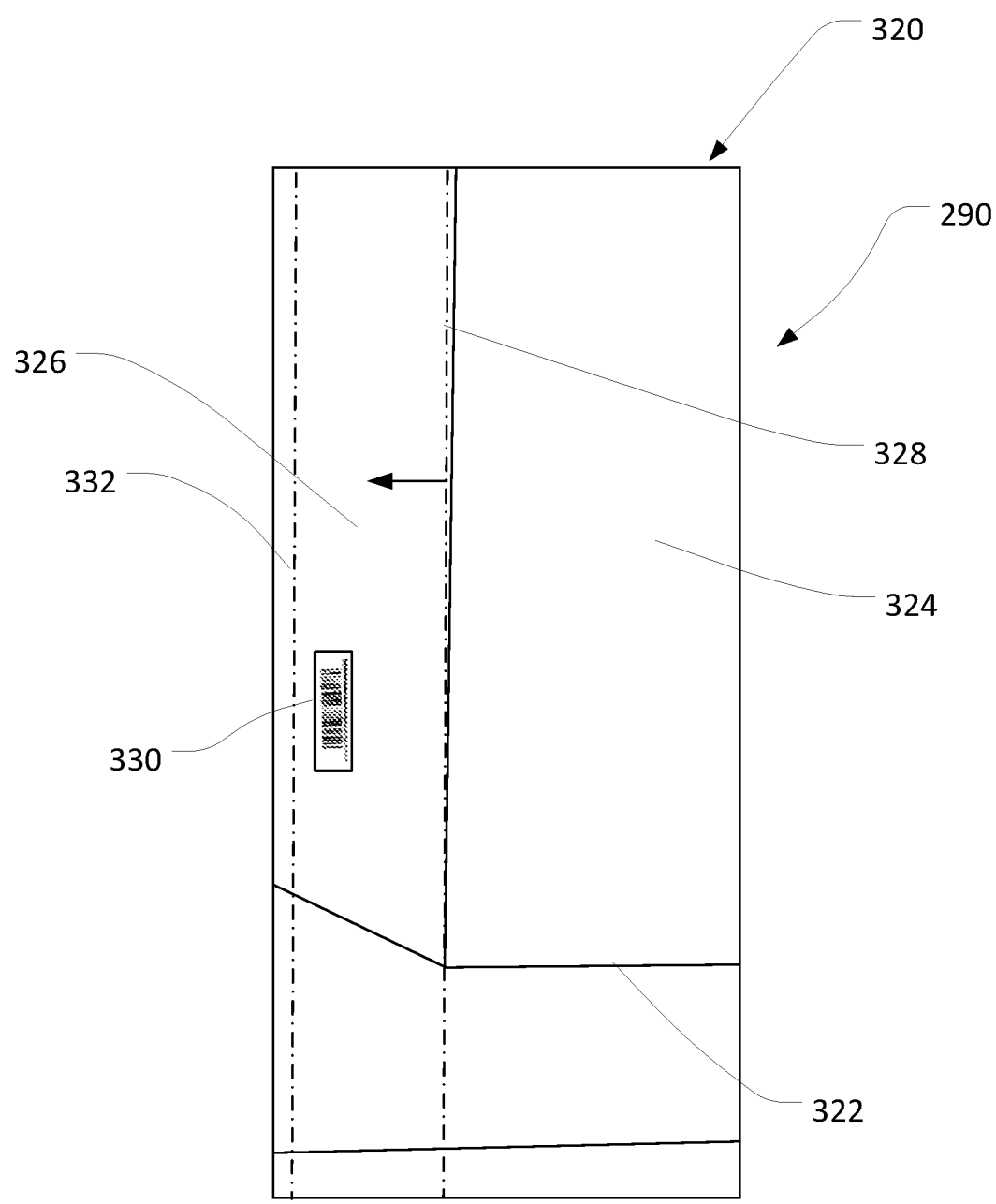
FIG. 12 is a view of a user interface for decoding symbols, according to an embodiments of the technology.

Referring now to FIG. 12, for example, an example image 320, as partially shown in the GUI 290, represents a box 322 such as may be imaged by a forward looking imaging device (e.g., the device 112a of FIG. 2), with a top face 324 and a rear face 326 being visible. In some embodiments, in accordance with the discussion above, a system according to the disclosed technology may sometimes be configured to determine that no symbols in the image 320 are on the box 322, because no symbol appears to the right of an identified 108 virtual trailing edge 328 of the box 322. In this regard, for example, a symbol 330 on the rear face 326 of the box 322 may be designated as off-object, because it is located to the left (i.e., rear) of the virtual trailing edge 328.

In some embodiments, to address this potential under-inclusion of on-object symbols, it may be possible to extend the effective boundaries of a particular object beyond one or more virtual object edges (at least as initially identified). For example, for the image 320, a reading range for on-object symbols can be extended by a particular distance (e.g., pixel count) rearward of the initially identified virtual trailing edge 328, so that the reading zone effectively extends into a gap between objects (e.g., similar to the gap 122 of FIG. 2). Accordingly, as shown in FIG. 12, selection of an appropriate extended virtual trailing edge 332 can allow the symbol 330 to be accurately characterized as being on the box 322, despite the symbol 330 being outside of a reading range bounded by the initially identified virtual trailing edge 328.

In some embodiments, it may be useful to impose limits on the distance by which a reading range may be extended. For example, some reading ranges may be initially bounded by identified virtual edges of an object, such as identified virtual leading and trailing edges of an object. From this initial state (or others), a reading range may sometimes be extended beyond one or both of the virtual edges, but by a distance that is less than a known gap distance between adjacent objects (e.g., successive objects on a conveyor system). With this appropriately extended reading range, it may then be accurately determined whether a particular symbol is positioned on or off of a particular object that corresponds to the (adjusted) reading range.

In some embodiments, one or both of the methods 190, 200 (see FIGS. 6 and 7) can include configuring an imaging device to read some distance into a gap as described above (i.e., to consider as on-object symbols that are beyond the boundaries defined by initially identified virtual object edges). For example, a particular GUI (e.g., the GUI 290) can include a selection box (not shown) that can toggle a "read into gap" function as well as associated fields (not shown), as appropriate, that allow the operator to designate an "into gap" distance by which on-object analysis should extend past one or more relevant virtual object edges. In some embodiments, this can usefully increase the number of symbols that are correctly designated as on-object, particularly for angled imaging devices.

As also noted above, in some embodiments, it may be useful to set a distance for reading into a gap to be less than the physical size of the object gap, so that symbols are not incorrectly designated as on-object due to inclusion of a subsequent object in an image within the boundaries of an adjusted virtual box edge. As an example, in some cases, the distance to read into a gap may be set to at least 0.5 inches less than the real-world box gap or at a predetermined fraction of the real-world box gap.

In some embodiments, other adjustments to a virtual object edge (or other feature) can also be implemented. For example, in some embodiments, consistently incorrect designations of a symbol as being "on" or "off" an object can indicate that the trigger location (e.g., the pixel location of a virtual object edge at a trigger event) may need to be adjusted. In some embodiments, changing a trigger location can shift the reading range for every subsequent image and, accordingly, can increase or decrease the number of symbols designated as on-object. In some situations, changing the trigger location can allow for a decrease in the distance read into a gap or even a reduction in the size of an initially determined space defined by initially determined virtual edges (as appropriate). In some embodiments, identification of a virtual edge can be adjusted separately from any adjustments to a trigger location.

In some examples above, identification of dimensions and analysis of objects may focus in particular on object heights and top surfaces. In other embodiments, however, similar principles can be implemented with a focus on other object dimensions (e.g., widths) and surfaces (e.g., side surfaces). For example, with imaging devices oriented to the sides of justified conveyors, similar analysis as discussed above can be implemented but with regard primarily to side surfaces of objects rather than top surfaces, and object widths (e.g., characteristic object widths, maximum expected, widths, etc.) rather than object heights. Similarly, in other configurations, other relevant dimensions and surfaces can be identified and addressed using equivalent, but relevantly reoriented, operations.

Also in some examples above, identified virtual edges or other relevant features of objects can be generally aligned with the pixel grid of the relevant imaging devices. In some implementations, objects or imaging devices may not be so aligned, such as if a camera is tilted relative to an object, or vice versa. In some case, accordingly, virtual (and actual) edges of an object may be represented as oriented lines within images. And, correspondingly, analysis discussed above relative to non-oriented lines can be adjusted to account for this difference, including according to know trigonometric (and other) principles.

As described herein, the present disclosure provides improved systems and methods for imaging objects on a conveyor and analyzing aspects of symbols associated with the objects. For example, some embodiments of the technology can determine the location of symbols relative to multiple objects using pre-determined characteristic aspects (e.g., heights and edge locations) of the full set of objects, rather than run-time analysis of precise aspects (e.g., heights and edge locations) of each of the objects individually. Further in this regard, some embodiments of the present disclosure can allow angled image capture, which reduces reflection interference, while still preserving the ability to readily identify whether particular symbols are on or off of an object, without the need to execute depth-from-scale analysis or other run-time dimensioning operations. Additionally, the present disclosure provides a setup method that can be performed while objects are stationary (i.e., the conveyor is not required to run during setup).

While the technology has been described with reference to example embodiments, it will be understood by those skilled in the art that various changes may be made and equivalents may be substituted for elements thereof without departing from the scope of the technology. In addition, many modifications will be appreciated by those skilled in the art to adapt a particular instrument, situation or material to the teachings of the technology without departing from the essential scope thereof. Therefore, it is intended that the technology not be limited to the particular embodiment disclosed as the best mode contemplated for carrying out this technology, but that the technology will include all embodiments falling within the scope of the appended claims.

What is claimed is:

1. A system for analyzing symbols on a set of objects having different sizes, including a reference object that exhibits a maximum expected dimension for the set of objects, the system comprising:
    one or more processor devices configured to:
        identify a characteristic object dimension for the set of objects corresponding to the maximum expected dimension for the set of objects;
        electronically receive an image of a first object, the first object having an actual dimension that spatially corresponds to but is different in size from the maximum expected dimension;
        identify in the image a virtual leading boundary feature for the first object;
        identify in the image, based on the characteristic object dimension, a virtual trailing boundary feature for the first object;
        identify, in the image, a first symbol; and
        determine, based on comparing a location of the first symbol in the image with locations of the virtual leading and trailing boundary features, whether the first symbol is positioned on the first object.

2. The system of claim 1, wherein the one or more processor devices are further configured to identify the characteristic object dimension based on a stored 3-dimensional (3D) representation of the reference object.

3. The system of claim 1, wherein the image of the first object includes a portion of a second object that is spaced apart from an actual trailing boundary feature of the first object; and
    wherein the one or more processor devices are configured to distinguished the second object from the first object in the image, to determine whether the first symbol is positioned on the first object, based on identifying the virtual trailing boundary feature of the first object.

4. The system of claim 3, wherein the one or more processor devices are further configured to:
    define an extended reading range in the image that extends:
        between the virtual leading boundary feature and the virtual trailing boundary feature; and
        beyond at least one of the virtual leading boundary feature or the virtual trailing boundary feature by a distance that is less than a known gap distance between the first and second objects; and
    determine whether the first symbol is positioned on the first object based on whether the first symbol is within the extended reading range in the image.

5. The system of claim 1, wherein at least one of the virtual leading boundary feature or the virtual trailing boundary feature is identified without determining a corresponding actual boundary feature of the first object in the image.

6. The system of claim 5, wherein the at least one of the virtual leading boundary feature or the virtual trailing boundary feature is identified without using depth-from-scale analysis.

7. The system of claim 5, wherein the at least one of the virtual leading boundary feature or the virtual trailing boundary feature is identified without receiving a dimensional measurement of the first object from a dimensioner.

8. The system of claim 5, wherein the at least one of the virtual leading boundary feature or the virtual trailing boundary feature is identified without using an actual dimension of the first object that corresponds spatially to the characteristic object dimension.

9. The system of claim 1, wherein at least one of the virtual leading boundary feature or the virtual trailing boundary feature is identified as corresponding to a respective pixel location in the image that is determined based on a distance traveled by the first object after the image is acquired, a predetermined trigger location corresponding to the image, and the characteristic object dimension.

10. The system of claim 1, wherein the one or more processor devices are further configured to identify the characteristic object dimension while the set of objects is stationary.

11. The system of claim 1, further comprising:
    an imaging device that is configured to acquire the image as a two-dimensional image.

12. The system of claim 11, for use with a conveyor that moves the objects horizontally in a first direction past the imaging device, wherein the imaging device is disposed with an optical imaging axis that extends at one or more of: a non-zero angle relative to vertical or an oblique angle relative to the first direction.

13. A system for analyzing symbols on a set of objects having different sizes, the system comprising:
    one or more processor devices configured to:
        determine a characteristic object dimension corresponding to the set of objects, the characteristic object dimension being different from a spatially corresponding actual dimension of a first object of the set;
        receive an image of the first object;
        identify a virtual trailing boundary feature for the first object in the image, based on the characteristic object dimension;
        identify, in the image, a first symbol; and
        determine, based on the virtual trailing boundary feature, whether the first symbol is positioned on the first object.

14. The system of claim 13, wherein the image of the first object includes a portion of a second object; and
    wherein the one or more processor devices are further configured to:
        identify, in the image, a second symbol;

determine, based on the virtual trailing boundary feature, that the second symbol is positioned on the second object; and store or buffer a representation of the second symbol for subsequent analysis of the second object.

15. The system of claim 13, for use as the objects are moving along a reference plane in a first direction, wherein the image is captured from a perspective that is at an oblique angle relative to at least one of the reference plane or the first direction.

16. The system of claim 15, further comprising an imaging device that is configured to capture the image, the imaging device being disposed with an optical axis that extends at the oblique angle.

17. The system of claim 16, wherein the oblique angle corresponds to the characteristic object dimension and a known spacing between subsequent objects.

18. The system of claim 13, for use with a conveyor system that is configured to move the first object with a known spacing from preceding or subsequent objects of the set, the known spacing corresponding to a known gap distance in the image, wherein the one or more processor devices are further configured to define a reading range in the image;

wherein the reading range extends, by a distance that is less than the known gap distance, beyond at least one of the virtual trailing boundary feature or a virtual leading boundary feature of the first object; and wherein determining whether the first symbol is positioned on the first object is further based on determining whether the first symbol is positioned within the reading range.

19. A method for analyzing symbols on a set of objects having different sizes, the method comprising:

determining setup parameters that include a characteristic object dimension corresponding to the set of objects;

receiving, from an imaging device, an image of a first object, the first object having at least one actual dimension that is different from the characteristic object dimension;

identifying, using one or more processor devices, a virtual leading boundary feature of the first object in the image, based on the setup parameters;

identifying, using the one or more processor devices, a virtual trailing boundary feature of the first object in the image, based on the setup parameters;

identifying, using the one or more processor devices, a first symbol in the image; and determining, using the one or more processor devices and based on the identified virtual leading and trailing boundary features, whether the first symbol is positioned on the first object.

20. The method of claim 19, wherein the characteristic object dimension includes at least one of a characteristic object width corresponding to a largest expected object width of the set of objects or a characteristic object dimension corresponding to a largest expected object height of the set of objects; and wherein the at least one of the characteristic object width or height is different than an actual object width of the first object or an actual object height of the first object, respectively.

* * * * *